United States Patent
Sadasivarao et al.

(10) Patent No.: US 12,149,873 B2
(45) Date of Patent: *Nov. 19, 2024

(54) SECURE AUTONOMIC OPTICAL TRANSPORT NETWORKS

(71) Applicant: Infinera Corp., Annapolis Junction, MD (US)

(72) Inventors: Abhinava Sadasivarao, Milpitas, CA (US); Sanjoy Bardhan, Annapolis Junction, MD (US); Sharfuddin Syed, San Jose, CA (US); Biao Lu, Saratoga, CA (US); Loukas Paraschis, Menlo Park, CA (US); Hao Su, San Jose, CA (US)

(73) Assignee: Infinera Corporation, San Jose, CA (US)

(*) Notice: Subject to any disclaimer, the term of this patent is extended or adjusted under 35 U.S.C. 154(b) by 688 days.

This patent is subject to a terminal disclaimer.

(21) Appl. No.: 17/127,248

(22) Filed: Dec. 18, 2020

(65) Prior Publication Data
US 2021/0258665 A1 Aug. 19, 2021

Related U.S. Application Data

(60) Provisional application No. 62/977,543, filed on Feb. 17, 2020.

(51) Int. Cl.
*H04L 29/06* (2006.01)
*H04L 9/00* (2022.01)
(Continued)

(52) U.S. Cl.
CPC ......... *H04Q 11/0067* (2013.01); *H04L 9/006* (2013.01); *H04L 9/3263* (2013.01);
(Continued)

(58) Field of Classification Search
CPC ....... H04Q 11/0067; H04Q 2011/0088; H04Q 2213/13339; H04L 9/006; H04L 9/3263
See application file for complete search history.

(56) References Cited

U.S. PATENT DOCUMENTS 10,785,809 B1 * 9/2020 Thubert .............. H04W 40/246
2013/0318343 A1 * 11/2013 Bjarnason ........... H04L 41/0809
713/157

(Continued)

OTHER PUBLICATIONS

ITU-T, G.709: Interfaces for Optical Transport Network, Std., 2012.
(Continued)

*Primary Examiner* — Malcolm Cribbs

(57) ABSTRACT

Consistent with the present disclosure, a method and related system for secure autonomic optical transport networks are disclosed. The method includes steps for adding a network element in an optical network. The method includes an initial step of verifying, with a new network element, a first identifier certificate from a proxy network element. In a further step, a second identifier certificate from the new network element is verified with the proxy element. A registrar is used for verifying the second identifier certificate from the proxy network element and sending domain specific parameters to the proxy network element for forwarding to the new network element Next, a local certificate is generated on the new network element. The local certificate is derived from a secure module and sent to the proxy network element for forwarding to the registrar. Further, the new network element in the autonomic domain is enrolled, with the registrar. Moreover, the local certificate is signed with the registrar and the signed local certificate is sent to the new network element.

12 Claims, 10 Drawing Sheets

(51) Int. Cl.
    *H04L 9/32*    (2006.01)
    *H04Q 11/00*   (2006.01)
(52) U.S. Cl.
    CPC ............... *H04Q 2011/0088* (2013.01); *H04Q 2213/13339* (2013.01)

(56) References Cited

U.S. PATENT DOCUMENTS

| | | | | |
|---|---|---|---|---|
| 2016/0164832 | A1* | 6/2016 | Bellagamba | H04L 45/64 726/11 |
| 2018/0176086 | A1* | 6/2018 | Thwaites | H04L 41/0886 |
| 2018/0302290 | A1* | 10/2018 | Rahman | H04L 41/22 |
| 2019/0259118 | A1* | 8/2019 | Eckert | G06Q 50/28 |
| 2019/0273727 | A1* | 9/2019 | Eckert | H04L 63/166 |
| 2020/0092115 | A1* | 3/2020 | Palmin | H04L 67/1001 |
| 2020/0169420 | A1* | 5/2020 | Lee | H04L 9/3265 |
| 2020/0327233 | A1* | 10/2020 | Pak | H04W 12/069 |

OTHER PUBLICATIONS

ITU-T, G.694.1: Spectral Grids for WDM Applications, Std., 2012.
Sadasivarao el al., "Open Transport Switch: A Software Defined Networking Architecture for Transport Networks", Proceedings of ACM SIGCOMM HotSDN, 2013.
Lopez et al., "Demonstration of SDN Orchestration in Optical Multivendor Scenarios" in Optical Fiber Communication Conference (OFC), 2015.
Gerstel et al., "Multi-layer Orchestration for Application-centric Networking," Proceedings of International Conference on Photonics in Switching (PS), 2015.
Rodrigues et al., "Traffic Optimization in Multi-layered WANs Using SDN," in Proceedings of the IEEE Symposium on High-Performance Interconnects (HOTI), 2014.
IETF, RFC 3945: Generalized Multi-Protocol Label Switching (GMPLS) Architecture, Std., Oct. 2004.
ONF, TR-527: Functional Requirements for Transport API, Std., Jun. 10, 2016.
IRTF, RFC 7575: Autonomic Networking: Definitions and Design Goals, Std., 2015.
IEEE, IEEE Std 802.1AR-2009, "IEEE Standard for Local and metropolitan area networks—Secure Device Identity", IEEE Computer Society, Dec. 22, 2009.
IETF, RFC 5280: Internet X.509 Public Key Infrastructure Certificate and Certificate Revocation List (CRL) Profile, Std., May 2008.
IETF, draft-ietf-anima-autonomic-control-plane-18: An Autonomic Control Plane, Std., 2018.
IETF, Rfc 6550: RPL—IPV6 Routing Protocol for Low-Power and Lossy Networks, Std., 2012.
Mayzaud et al., "Using the RPL Protocol for Supporting Passive Monitoring in the Internet of Things", in Proceedings of the IEEE/IFIP Network Operations and Management Symposium (NOMS), 2016.
IETF, RFC 6551: Routing Metrics Used for Path Calculation in Low-Power and Lossy Network, Std., 2012.
OpenROADM Multi-source Agreement, http://www.openroadm.org, last visited Dec. 16, 2020.
Onf, Open and Disaggregated Transport Network (ODTN), https://www.opennetworking.org/odtn/, last visited Dec. 16, 2020.
Yilmaz et al., "Automated Management and Control of a Multi-Vendor Disaggregated Network At the L0 Layer", in Proceedings of the Optical Fiber Communication Conference (OFC), 2018.
Opendaylight, https://www.opendaylight.org/, last visited Nov. 30, 2020.
3GPP, TS 32.500: Telecommunication management; Self-Organizing Networks (SON); Concepts and requirements, Std., 2015.
Sung et al., "Robotron: Top-down Network Management at Facebook Scale", in Proceedings of the ACM SIGCOMM, 2016.
Koley, "The Zero Touch Network", in Proceedings of IEEE International Conference on Network and Service Management (CNSM), 2016.
Arista, "Arista Zero Touch Provisioning", https://www.arista.com/en/solutions/zero-touch-provisioning, 2016.
Cisco, "Using Zero Touch Provisioning", Cisco ASR 920 Series Aggregation Services Router Configuration Guide, Cisco IOS XE Release 3.18, Feb. 2017.
Hertoghs, Yves, Cisco, "Autonomic Networking: Where Do We Go From Here?," https://blogs.cisco.com/getyourbuildon/autonomic-networking-where-do-we-g-from-here?dtid=osscdc000283 (last visited Dec. 16, 2020), dated May 22, 2014.
OpenDaylight, Secure Network Bootstrap Infrastructure (SNBI) https://wiki.opendaylight.org/view/SNBI_Architecture_and_Design, last visited Nov. 30, 2020.
IETF, draft-ietf-anima-bootstrapping-keyinfra-16: Bootstrapping Remote Secure Key Infrastructures (BRSKI), Std., 2018.
IETF, draft-ietf-anima-grasp-15: A Generic Autonomic Signaling Protocol (GRASP), Std., 2017.
ETSI, GS-AFI-002: Autonomic Network Engineering for the Selfmanaging Future Internet (AFI), Std., 2013.
Emilio Riccardi, "Disaggregation at the Optical Layer: Toward an Optical White Boxes Ecosystem?", Proceedings of the Advanced Photonics, 2018.
Kamalov et al., "Lessons Learned from Open Line System Deployments", Proceedings of the Optical Fiber Communication Conference (OFC), 2017.
L. Barletta et al., "QoT Estimation for Unestablished Lightpaths using Machine Learning", in Proceedings of the Optical Fiber Communication Conference (OFC), 2017.
M. Bouda et al., "Accurate Prediction of Quality of Transmission with Dynamically Configurable Optical Impairment Model", in Proceedings of the Optical Fiber Communication Conference (OFC), 2017.
Sadasivarao et al., "Optonomic: Architecture for Secure Autonomic Optical Transport Networks," *2019 IFIP/IEEE Symposium on Integrated Network and Service Management (IM)*, Arlington, VA, USA, Apr. 2019, pp. 321-328.
ITU-T, G.709: Interfaces for Optical Transport Network, Std., 2020.

\* cited by examiner

SECURE AUTONOMIC OPTICAL TRANSPORT NETWORKS

INCORPORATION BY REFERENCE

The present application claims priority to Provisional Patent Application U.S. Ser. No. 62/977,543 titled "Architecture for Secure Autonomic Optical Transport Networks" filed on Feb. 17, 2020, the entire contents of which are hereby expressly incorporated herein by reference.

BACKGROUND

Optical transport networks are a critical component of the global Internet backbone. This infrastructure acts as the underlay, providing the plumbing for all other communications to take place (e.g., access, metro, and long-haul). In the traditional 7-layer OSI model, transport networks constitute the Layer 1 functions, providing digital transmission of bit streams transparently across varying distances over a chosen physical media (in this case, optical). Transport networks also encompass an entire class of devices (which are referred to as Layer 0), which purely deal with optical photonic transmission and wavelength division multiplexing (WDM). This includes amplification, (re-)generation and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

Traditionally, transport networks have often been "fixed" (or "static") in the sense that their primary responsibility is to act as point-to-point underlay, providing necessary connectivity between Layer 2/Layer 3 (Ethernet/IP) domains. Recent innovations in optical technologies and the advent of software defined networking (SDN) approaches are making optical transport networks dynamic and programmable. This includes transport network data plane abstractions, multi-vendor optical orchestration, multi-layer packet-optical orchestration, and multi-layer packet-optical optimization, to name a few.

However, optical transport networks remain highly manually driven with the process of deploying and managing optical networks involving a significant amount of manual procedures.

The present disclosure addresses these needs with methodology and apparatus for securely bootstrapping a new network element into an autonomic domain of an optical network by establishing trusted communication with a proxy network element which enables secure communication with a registrar. The inventive autonomic optical network transforms traditional deployment and operational models of optical transport networks. Barring physical installation of the equipment (Day 0), the subsequent commissioning phase and maintenance has minimal human intervention. The inventive networks ensure security to ensure authenticity, trust, and integrity of the physical infrastructure.

SUMMARY

Methods and systems for secure autonomic optical transport networks are disclosed. In some implementations, methods of adding a network element in an optical network may comprise: connecting a new network element to an optical network having an autonomic domain comprising a proxy network element and a registrar, the new network element, the registrar, and the proxy network element each having an instance of an autonomic control plane and having a secure module, the secure module on the proxy network element storing a first identifier certificate and the secure module on the new network element storing a second identifier certificate; verifying, with the autonomic control plane on the new network element, the first identifier certificate from a first verification signal from the proxy network element; verifying, with the autonomic control plane on the proxy network element, the second identifier certificate from a second verification signal from the new network element; verifying, with the autonomic control plane on the registrar, the second identifier certificate from a third verification signal from the proxy network element; sending, with the autonomic control plane on the registrar, upon verification of the second identifier certificate, a parameters signal to the proxy network element, the parameters signal containing domain specific parameters; forwarding, with the autonomic control plane on the proxy network element, the parameters signal to the new network element; generating, with the autonomic control plane on the new network element, a local certificate derived from the secure module of the new network element and sending a certificate signal to the proxy network element, the certificate signal containing the local certificate; forwarding, with the autonomic control plane on the proxy network element, the certificate signal to the registrar; enrolling, with the autonomic control plane on the registrar, the new network element in the autonomic domain; and signing, with the autonomic control plane on the registrar, the local certificate, and sending a registration signal to the new network element, the registration signal containing the signed local certificate.

In some implementations, verifying the first identifier certificate with the autonomic control plane on the new network element may further comprise: establishing a supervisory channel between the new network element and the proxy network element over the optical network with the autonomic control plane of the new network element; and sending, with the autonomic control plane on the proxy network element, the first verification signal over the supervisory channel to the new network element, the first verification signal containing the first identifier certificate.

In some implementations, the first identifier certificate stored on the secure module of the proxy network element and the second identifier certificate stored on the secure module of the new network element are assigned by a manufacturer of the proxy network element and the new network element.

In some implementations, verifying, with the autonomic control plane on the registrar, the second identifier certificate comprises comparing the second identifier certificate of the new network element to a list of identifiers to find a matching identifier.

In some implementations, the list of identifiers is received by the registrar and wherein the registrar verifies the list of identifiers by utilizing a public encryption key.

In some implementations, verifying, with the autonomic control plane on the proxy network element, the second identifier certificate comprises utilizing a public encryption key to verify the second identifier certificate of the new network element.

In some implementations, the registration signal further contains an initial configuration and a software image and, further comprising, deploying the initial configuration and installing the software image, upon receiving the registration signal, with the autonomic control plane on the new network element.

In some implementations, establishing the connection between the new network element and the proxy network element with the autonomic control plane of the new network element further includes exchanging a series of connection signals between the autonomic control plane on the new network element and the autonomic control plane on the proxy network element over a supervisory channel to establish an encrypted channel of communication between the new network element and the proxy network element.

In some implementations, establishing the connection between the new network element and the proxy network element with the autonomic control plane of the new network element is establishing a link-local connection on a supervisory channel.

In some implementations, an exemplary optical network may comprise: a proxy network element comprising a first processor, at least one first non-transitory computer readable medium storing a first autonomic control plane, a first secure unique device identifier module storing a first identifier certificate, and a first communication device; a new network element comprising a second processor, at least one second non-transitory computer readable medium storing a second autonomic control plane, a second secure unique device identifier module storing a second identifier certificate, and a second communication device, the second autonomic control plane configured to: establish an out-of-band overhead channel to the proxy network element without user intervention; receive a first verification signal from the proxy network element, the first verification signal including the first identifier certificate; verify the first identifier certificate; and send a second verification signal to the proxy network element, the second verification signal containing the second identifier certificate; and a registrar comprising a third processor, at least one third non-transitory computer readable medium storing a third autonomic control plane, a third secure unique device identifier module, and a third communication device, the third autonomic control plane configured to: receive an enrollment signal containing the second identifier certificate and a request to enroll the new network element with the registrar from the proxy network element after the proxy network element receives the second verification signal and verifies the second identifier certificate; verify the second identifier certificate; send a parameters signal to the new network element containing domain specific parameters; receive a local certificate from the new network element; verify the local certificate; enroll the new network element in an autonomic domain; sign the local certificate; and send an enrollment signal to the new network element containing the signed local certificate.

In some implementations, the enrollment signal further contains an initial configuration and a software image and, upon receiving the enrollment signal, the autonomic control plane on the new network element causes the new network element to deploy the initial configuration and install the software image.

In some implementations, the second identifier certificate stored on the second secure unique device identifier module of the new network element and the first identifier certificate stored on the first secure unique device identifier module of the proxy network element are assigned by a manufacturer of the proxy network element and the new network element.

In some implementations, verifying, with the third autonomic control plane on the registrar, the second identifier certificate comprises comparing the second identifier certificate of the new network element to a list of identifiers to find a matching identifier.

In some implementations, the list of identifiers is received by the registrar and the registrar verifies the list of identifiers by utilizing a public encryption key.

In some implementations, verifying, with the first autonomic control plane on the proxy network element, the second identifier certificate comprises utilizing a public encryption key to verify the second identifier certificate of the new network element.

In some implementations, the enrollment signal further contains an initial configuration and a software image and the second autonomic control plane causes the new network element to deploy the initial configuration and install the software image on the at least one second non-transitory computer readable medium.

In some implementations, establishing the out-of-band overhead channel between the new network element and the proxy network element with the second autonomic control plane of the new network element further includes exchanging a series of connection signals between the second autonomic control plane on the new network element and the first autonomic control plane on the proxy network element over the out-of-band overhead channel to establish a secure, encrypted channel of communication between the new network element and the proxy network element.

In some implementations, establishing the out-of-band overhead channel between the new network element and the proxy network element with the second autonomic control plane of the new network element is establishing a link-local connection.

In some implementations, a method of creating an autonomic domain of an optical network may comprise connecting a registrar to a network, the registrar having a first autonomic control plane; connecting a new network element to the network, the new network element having a second autonomic control plane; causing the second autonomic control plane on the new network element, upon connection to the network, to establish a communication channel between the new network element and the registrar over the network; causing the second autonomic control plane on the new network element, upon establishment of the communication channel, to establish a link-local connection on the communication channel between the new network element and the registrar; causing the second autonomic control plane on the new network element and the first autonomic control plane on the registrar, upon establishment of the link-local connection, to exchange a series of connection signals over the link-local connection to establish a secure, encrypted channel of communication between the new network element and the registrar; causing the first autonomic control plane on the registrar, upon establishment of the secure, encrypted channel, to send a first verification signal over the secure, encrypted channel of communication to the new network element, the first verification signal containing a first identifier certificate, the first identifier certificate being generated using a secure unique device identification of the registrar; causing the second autonomic control plane on the new network element, upon receiving the first verification signal, to verify the first identifier certificate; causing the second autonomic control plane on the new network element, upon verification of the first identifier certificate, to send a second verification signal to the registrar over the secure, encrypted channel of communication, the second verification signal containing a second identifier certificate, the second identifier being generated using a secure unique device identification of the new network element; causing the first autonomic control plane on the registrar, upon receiving the second verification signal, to verify the second identifier certificate; causing the first autonomic control plane on the registrar, upon verification of the second identifier certificate, to send a parameters signal over the secure, encrypted channel of communication to the new network element, the parameters signal containing domain specific parameters; causing the second autonomic control plane on the new network element, upon receiving the parameters signal, to generate a local certificate and send a certificate signal over the secure, encrypted channel of communication to the registrar, the certificate signal containing the local certificate; and causing the first autonomic control plane on the registrar, upon receiving the certificate signal, to enroll the new network element in the optical network and establish an autonomic domain comprising the registrar and the new network element, sign the local certificate, and send a registration signal to the new network element over the secure, encrypted channel of communication, the registration signal containing the signed local certificate.

In some implementations, a method for adding a network element to an optical domain may comprise: sending from, and receiving to, an autonomic control plane on a proxy network element in an optical domain, a series of connection signals with an autonomic control plane on a new network element, over a link-local connection, to establish an encrypted channel of communication between the new network element and the proxy network element; sending, with the autonomic control plane on the proxy network element, a first verification signal over the encrypted channel of communication to the new network element, the first verification signal containing a first identifier certificate, the first identifier certificate being generated using a secure unique device identifier of the proxy network element; receiving, with the autonomic control plane on the proxy network element, a second verification signal to the proxy network element over the encrypted channel of communication, the second verification signal containing a second identifier certificate, the second identifier certificate being generated using a secure unique device identifier of the new network element after the new network element has verified the first identifier certificate with the autonomic control plane on the new network element; verifying, with the autonomic control plane on the proxy network element, the second identifier certificate; sending, with the autonomic control plane on the proxy network element, upon verification of the second identifier certificate, a third verification signal to a registrar in the optical domain, over a supervisory channel, the third verification signal containing the second identifier certificate; receiving, with the autonomic control plane on the proxy network element from the registrar, a parameters signal over the supervisory channel, the parameters signal containing domain specific parameters, after verification of the second identifier certificate by the registrar; forwarding, with the autonomic control plane on the proxy network element, the parameters signal over the encrypted channel of communication to the new network element; receiving, with the autonomic control plane on the proxy network element from the new network element, a certificate signal containing a local certificate of the new network element, over the encrypted channel of communication; forwarding, with the autonomic control plane on the proxy network element, the certificate signal to the registrar; and receiving, with the autonomic control plane on the proxy network element from the registrar, a registration signal over the supervisory channel, the registration signal containing a signed local certificate signed by the registrar.

In some implementations, a method for adding a network element to an optical network may comprise: receiving, with a registrar over a supervisory channel in an autonomic domain of an optical network, a verification signal from a proxy network element containing a secure identifier certificate indicative of a secure unique device identifier for a new network element, the secure identifier certificate verified by a proxy network element; verifying, with an autonomic control plane on the registrar, the secure identifier certificate of the new network element; sending, with the autonomic control plane on the registrar, upon verification of the second identifier certificate, a parameters signal over the supervisory channel to the proxy network element, the parameters signal containing domain specific parameters for the proxy network element to forward to the new network element over an encrypted channel of communication between the proxy network element and the new network element; receiving, by the registrar, a certificate signal from the proxy network element, the certificate signal containing a local certificate for the new network element first transmitted to the proxy network element from the new network element over the encrypted channel of communication; and enrolling, with the registrar, the new network element in the autonomic domain; signing, with the registrar, the local certificate; and sending, by the registrar, a registration signal to the new network element over the supervisory channel, the registration signal containing the signed local certificate.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
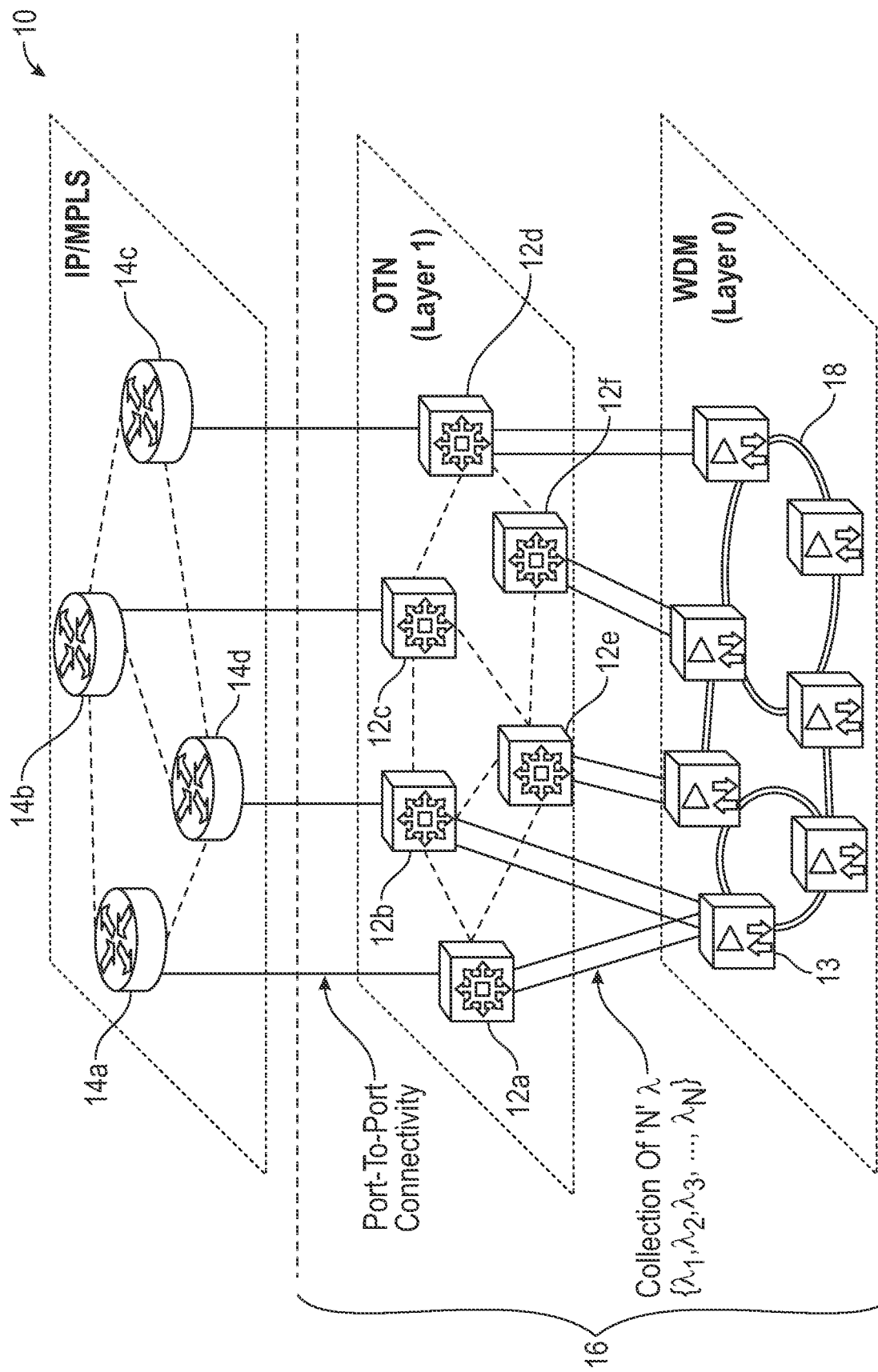
FIG. 1 is a diagram of an exemplary optical transport network topology illustrating examples of certain hardware elements of the optical transport network within the topology.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The systems and methods as described in the present disclosure are capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

Circuitry, as used herein, may be analog and/or digital components including optical photonic integrated circuits, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

DEFINITIONS

If used throughout the description and the drawings, the following terms have the following meanings unless otherwise stated:

WDM stands for wavelength division multiplexing.

OADM stands for optical add/drop multiplexing.

R/OADM stands for reconfigurable optical add/drop multiplexing.

OTN stands for optical transport network.

SDN stands for software defined networking.

Bootstrapping refers to the process of secure enrollment where every new device in the network mutually authenticates its adjacent neighbors and registers itself with a global registrar.

EDFA stands for erbium-doped fiber amplifier.

Raman refers to optical amplifiers based on Raman gain.

CDC stands for colorless, directionless, and contentionless.

WSS stands for wavelength selective switches.

AAA stands for authentication, authorization, and accounting.

Supervisory channel refers to an out-of-band channel for dedicated communication between network elements. While the exemplary network elements described herein are generally optical and would operate on an optical specific supervisory channel such as an Optical Supervisory Channel (OSC), it should be noted that the methods described herein apply to other network types as well. In such embodiments, other communication channels may be used such as a Generic Communication Channel (GCC) or a data communication network (DCN) typically running internet protocol over ethernet.

ACP stands for autonomic control plane which is software or a suite of software that causes a processor to perform the functions described herein.

Secure module refers to a secure computing environment that is isolated and tamper resistant. The secure module is designed to make it hard to extract data or "crack." The secure module holds unique cryptographic keys which allow other devices or off-device entities to communicate securely with the device which includes the secure module. The secure module is designed to only run code from the manufacturer, or if the secure module allows third-party code, it has to be signed, often not by the end-user of the device. SUDI stands for secure unique device identifier which is one specific example of a secure module that may perform the functions described herein. Other secure modules that may perform the functions described herein are a Trusted Platform Module (TPM), a Hardware Security Module (HSM), and a Trusted Service Manager (TSM), for example. It should be noted that the terms SUDI and secure module are used interchangeably herein but refer generally to any secure module that performs the functions described herein.

IP stands for Internet Protocol which is a protocol used for communicating data across a packet-switched internetwork using the Internet Protocol Suite, also referred to as TCP/IP.

IDevID stands for initial secure device identifier.

LDevID stands for locally significant secure device identifiers.

RPL stands for routing protocol for low-power and lossy networks.

NE stands for network elements.

GMPLS stands for generalized multi-protocol label switching.

OSPF-TE stands for open shortest path first-traffic engineering.

RSVP-TE stands for resource reservation protocol-traffic engineering.

XCON stands for cross-connection.

SRLG stands for shared risk link groups.

GUI stands for graphical user interface

EMS stands for embedded management interfaces.

OAM stands for open application model.

FCAPS stands for fault, configuration, accounting, performance, and security and is a network management framework created by the International Organization for Standardization (ISO).

NETCONF stands for network configuration protocol and is a protocol defined by the IETF to install, manipulate, and delete the configuration of network devices. NETCONF operations are realized on top of a Remote Procedure Call (RPC) layer using an XML encoding and provide a basic set of operations to edit and query configuration on a network device.

Tl-1 stands for transaction language 1 and is a widely used management protocol in telecommunications.

DODAG stands for destination-oriented directed acyclic graphs.

DESCRIPTION

An exemplary integrated optical transport network consists of two distinct domains: Layer 1 ("digital domain") and Layer 0 ("optical domain") data planes. Layer 1 functions encompass transporting client signals (e.g., Ethernet, SONET/SDH) in a manner that preserves bit transparency, timing transparency, and delay-transparency. The predominant technology for digital layer data transport in use today is OTN (for example, as defined by ITU G.709). Layer 1 may transport "client layer" traffic. Layer 1 may be a digital layer including multiplexing and grooming. Layer 0 is responsible for fixed or reconfigurable optical add/drop multiplexing (R/OADM) and optical amplification (EDFA or Raman) of optical carriers and optical carrier groups (OCG), which operate in wavelength regions ranging from 1260 nm to 1625 nm which are divided into five wavelength bands referred to as the O-, E-, S-, C- and L-bands. R/OADM functions are facilitated via colorless, directionless, and contentionless (CDC) wavelength selective switches (WSS). Layer 0 may include the frequency grid (for example, as defined by ITU G.694.1), ROADMs, FOADMs, Amps, Muxes, Line-system and Fiber transmission, and GMPLS Control Plane (with Optical Extensions).

Referring now to the drawings, and in particular FIG. 1, shown therein is a top-down view of topology of an example optical network 10 having exemplary optical transport network elements 12a-12f (also referred to in the plural as NEs 12a-12f and in the singular as simply NE 12) connected to optical add drop modules (OADM) 13 (only one of which is numbered in FIG. 1) within the topology. It should be noted that in some embodiments of the optical network 10, OADM 13 may be part of and/or co-located with the network element 12. IP/MPLS routers 14a-14d peer with each other via a Layer 1 and Layer 0 optical underlay 16. IP/MPLS/Ethernet client traffic transits through a series of such optical transport network elements 12a-12f in an end-to-end path 18.

Traditionally, optical transport NEs 12 were equipped with an embedded control plane such as GMPLS which allows bandwidth management and traffic engineering capabilities. This control plane typically supports OSPF-TE for routing and RSVP-TE for signaling of the cross-connections (XCON). In such a system, a request to setup a connection between a source and destination results in an OSPF-TE route query followed by hop-by-hop RSVP-TE XCON signaling, if the route with the specified constraints is found. Resource information disseminated for path computation includes available time slots on the link, link weight/metrics, latency, optical spectrum availability (frequency slots), optical span loss, fiber SRLG information and other attributes, for example. GMPLS control plane also supports dynamic restoration/re-route in case of connection failures.

As for management interfaces, optical transport NEs 12 support a variety of embedded management interfaces. These range from command line interface to GUI based element management systems (EMS). Examples include TL-1 and NETCONF for FCAPS and OAM. Management interfaces can also support provisioning of manual XCONs if the NE 12 does not have GMPLS control plane capabilities.

In some implementations, using SDN approaches, control functions can be separated from the optical data path. In such an exemplary scenario, the optical NE 12 provides standardized data path interfaces (such as OpenFlow as described in ONF, TR-527: Functional Requirements for Transport API, Std., 2016, the entirety of which is hereby incorporated by reference) that allows a centralized SDN Controller to perform routing computations. The SDN Controller then programs the devices via these interfaces allowing data plane connectivity to be established.

The inter-NE control and management plane data is exchanged over an in-fiber-out-of-band overhead channel known as Optical Supervisory Channel (OSC). The OSC is a dedicated, well-known wavelength (1510 nm) outside of the C-Band. Traditional OSC implementations provide approximately 155 Mbps bandwidth (SONET OC-3/STM-1 client) and the OSC is typically not used to transport any data plane traffic.

There are various stages involved in optical network equipment deployment. These stages may comprise:
  (a) Fiber Plant Installation: Involving ground installation of optical fiber plant, terrestrial, or submarine. Fiber installation is expensive and cyclic, depending upon capacity/demand projections.
  (b) Setting up of Layer 0 (line-system): Includes installation of fiber amplifiers (situated every approximately 150 km), installation of optical (R)OADM for every fiber degree/direction and port-to-port fiber patches.
  (c) Setting up of Layer 1: Includes installation of digital ADMs and port-to-port fiber patches of digital ADMs to (R)OADM equipment.

After the physical equipment installation, the network administrator performs test and turn-up tasks for the optical Layer 1/Layer 0 transport network to be operational. This comprises control and management plane configurations including one or more of administering management IP addresses, creation of new user accounts & AAA policies, administering GMPLS/OSPF Router IDs, default traffic engineering routing criteria, and reserving protection bandwidth priorities.

Figure 2:
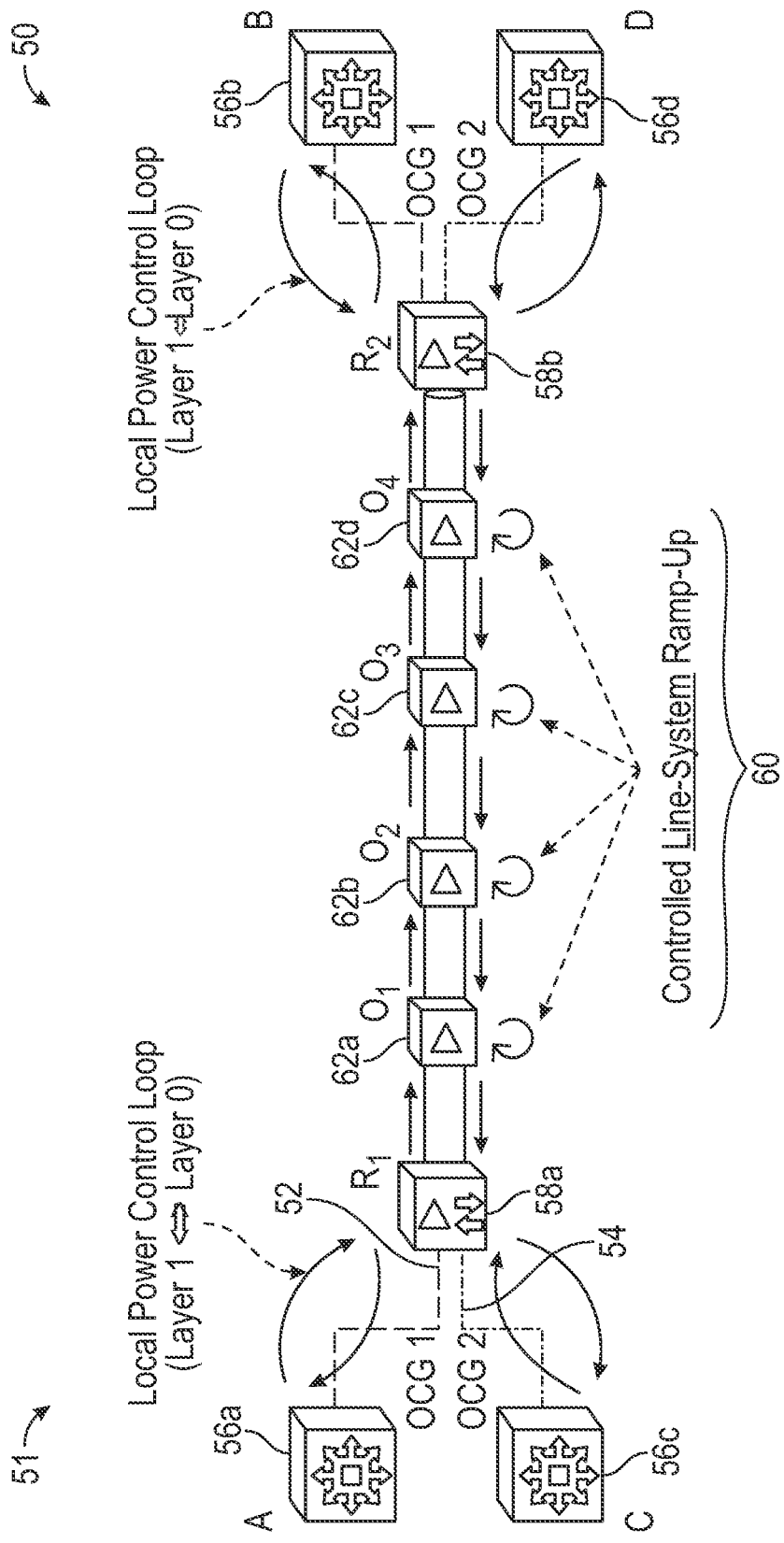
FIG. 2 is a diagram of an exemplary optical transport network illustrating a local power control loop.

Referring now to FIG. 2, shown therein is an exemplary optical transport network 50 including terminal devices 56, OADM devices 58, a first OCG 52, a second OCG 54, and one or more EDFAs 62a-62d, which provides an environment for the inventive concepts herein. Before operators provision services over the optical transport network 50, an end-to-end Layer 1 and Layer 0 data path, such as path 51, should be operationally enabled. Several optical parameters, that may include output power, gain, and tilt, may need fine-tuning for the end-to-end data path 51 to be operational.

Figure 3A:
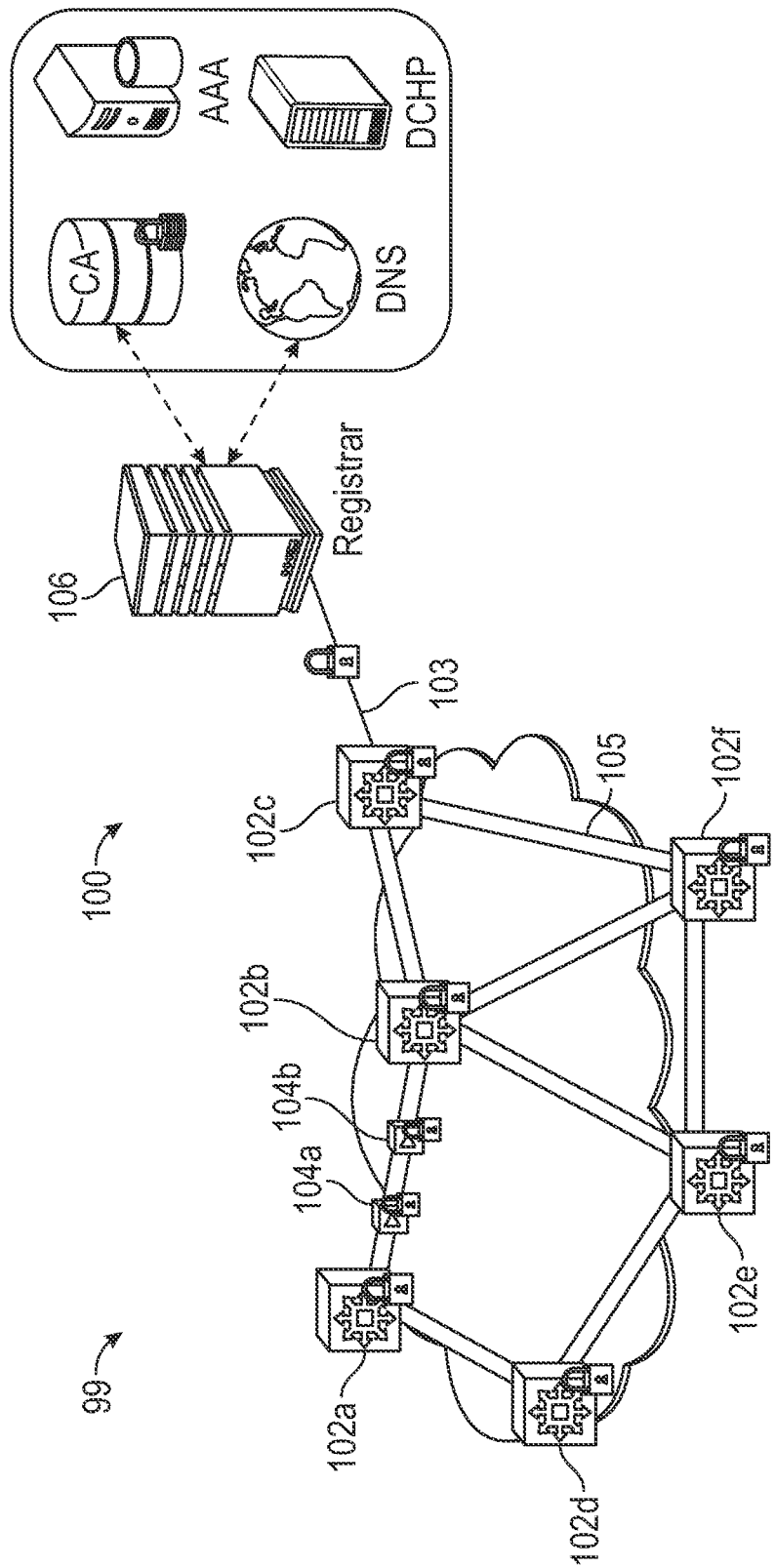
FIG. 3A is a diagram of an exemplary autonomic domain of an optical transport network in accordance with one aspect of the present disclosure.
Figure 3B:
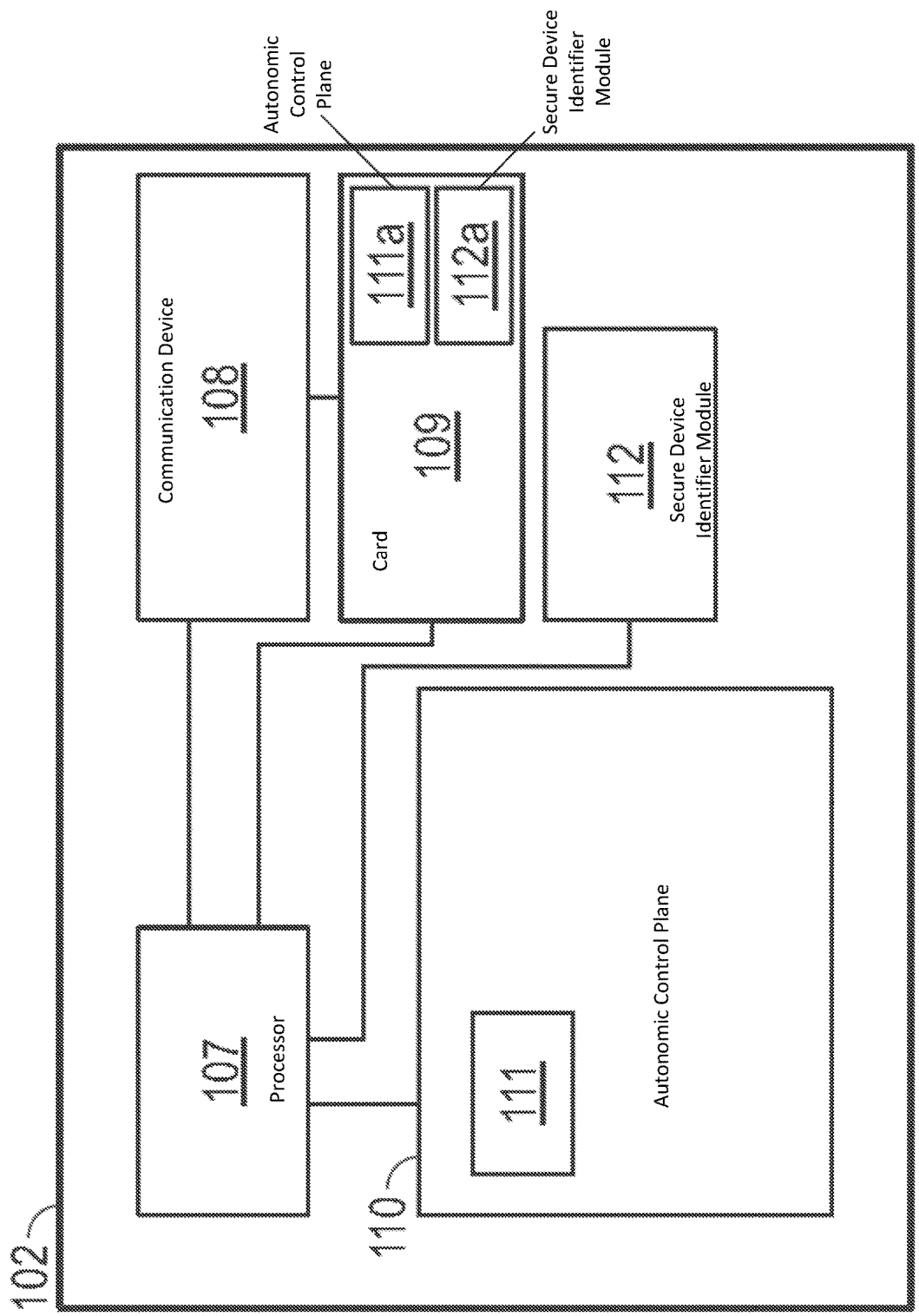
FIG. 3B is a diagram of an exemplary autonomic optical network element in accordance with one aspect of the present disclosure.
Figure 3C:
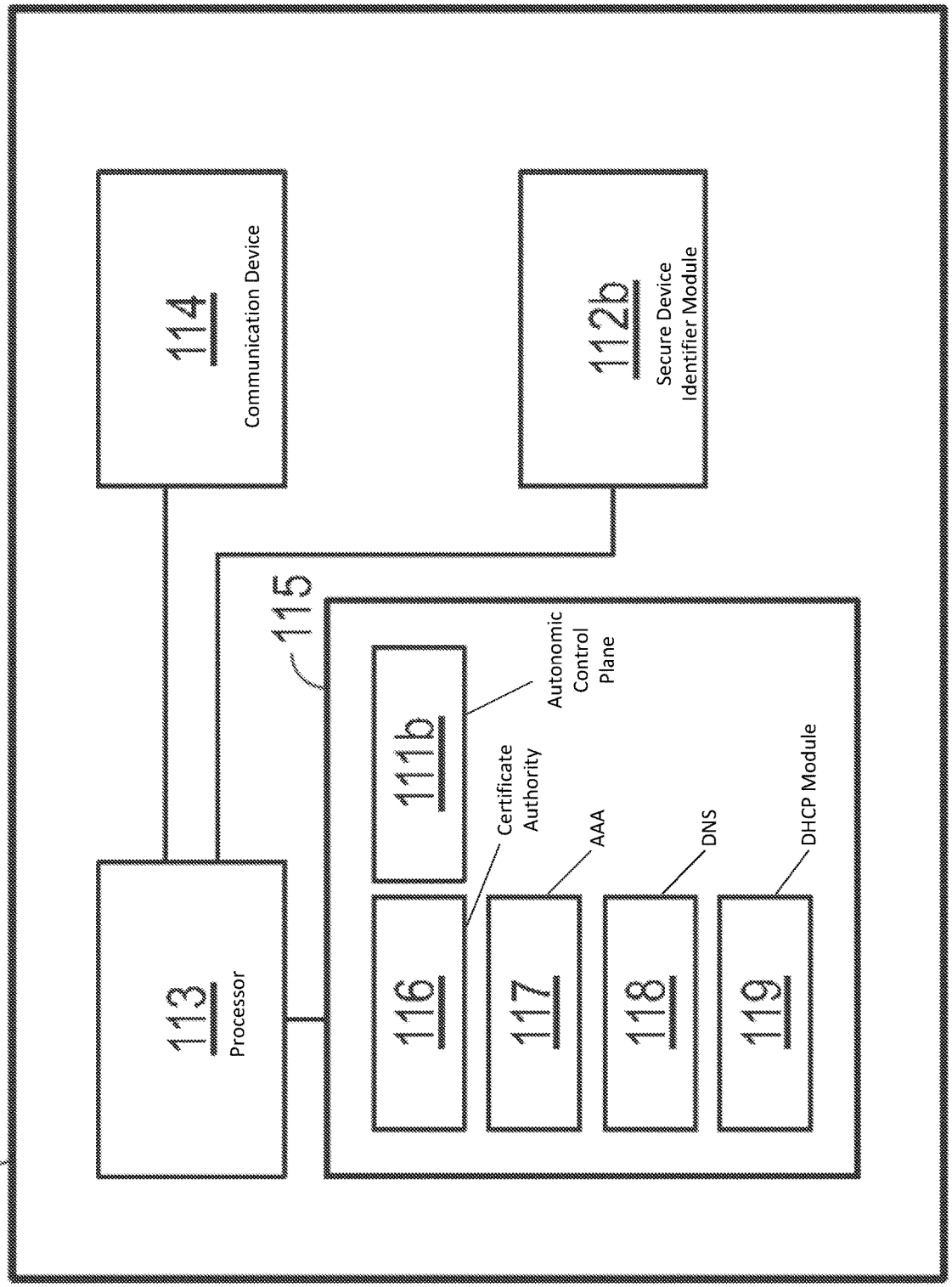
FIG. 3C is a diagram of an exemplary registrar in accordance with one aspect of the present disclosure.

Referring now to FIGS. 3A-3C, shown therein is an exemplary autonomic optical network 99 having an autonomic domain 100 which may comprise a set of Layer 1 autonomic optical network elements 102a-102f and optical amplifiers 104a and 104b. A registrar 106 is directly connected to one or more of the autonomic optical network elements 102, such as a third autonomic optical network element 102c, and acts as a gateway to other network services. It should be noted that while the network 99 is referred to as an "optical network," a connection 103 between the third autonomic optical network element 102c and the registrar 106 may be a digital connection running internet protocol over ethernet while connections 105 (only one of which is designated in the figures) between each of the optical network elements 102a-102f and optical amplifiers 104a and 104b may be optical. The autonomic optical network elements 102a-102f may also be referred to as nodes.

The overall architecture of the autonomic optical network 99 draws upon design principles from IRTF, RFC 7575: Autonomic Networking: Definitions and Design Goals, Std., 2015, the contents of which are hereby expressly incorporated herein by reference. Specifically, aspects of node-level autonomy for self-management and self-configuration are incorporated.

The broad objective of the autonomic optical network 99 is to transform traditional deployment and operational model of optical transport networks. As discussed above, the process of deploying and managing optical networks involves a significant number of manual procedures. Barring physical installation of the equipment (Day 0), subsequent commissioning phase and maintenance should be zero-touch to the maximum possible extent having minimal human intervention.

In general, the autonomic optical network 99 comprises one or more of the autonomic optical network elements 102, optical amplifiers 104, and domain registrar 106.

The following are the focus areas that the autonomic optical network 99 disclosed herein addresses:
  (a) Secure Enrollment: For a given optical network administrative domain, such as autonomic domain 100, every new autonomic optical network element 102 is securely enrolled into this autonomic domain 100. Each autonomic optical network element 102 may have a secure (unique) device identity and may prove its cryptographic credentials to the domain registrar 106.
  (b) Self-configuring and Zero-touch Commissioning: Once enrolled, the autonomic optical network element 102 may be bootstrapped in a zero-touch fashion. This involves the ability to upgrade the autonomic optical NE 102 from factory defaults to a desired software image. In addition, the autonomic optical NE 102 can be initialized to the desired data, control, and management plane configuration.
  (c) Self-managed Operations: After commissioning the equipment, the ability of the autonomic optical network 99 to self-manage data plane and control plane states subject to the changes observed, which can be either nodal or network level.

An operator's optical infrastructure may be decomposed into one or more administrative domains such as an autonomic domain 100. The optical infrastructure may be divided into administrative domains for ease of maintenance, for example.

An exemplary embodiment of the autonomic optical network element 102 is shown in FIG. 3B. The autonomic optical network element 102 may be provided with a processor 107, a communication device 108, one or more cards 109, non-volatile computer readable memory 110 (herein "memory 110") storing an autonomic control plane 111, and a secure device identifier module 112. The one or more cards 109 may be provided with an autonomic control plane 111a and a secure device identifier module 112a.

Layer 1 specific embodiments of autonomic optical network element 102 may optionally be provided with additional elements that are not shown in the Figures such as an optical transceiver, a digital signal processor (DSP), and additional high-speed silicon (ASIC or FPGA) that is specialized to handle high-speed data frames/packets.

Layer 0 specific embodiments of autonomic optical network element 102 may optionally be provided with additional elements that are not shown in the Figures such as a WSS, VOA, EDFA or Raman amplifiers, and optical channel monitors, for instance.

An exemplary embodiment of the registrar 106 is illustrated in FIG. 3C. The registrar 106 may be provided with a processor 113, a communication device 114, non-volatile computer readable memory 115 (hereinafter "memory 115") storing an autonomic control plane 111b, a certificate authority 116, an authentication, authorization and accounting module (AAA) 117, a domain name system (DNS) 118, and a dynamic host configuration protocol (DHCP) module 119, and a secure device identifier module 112b.

While the certificate authority 116, AAA 117, DNS 118, and DHCP module 119 have been described as being stored in non-volatile computer readable memory 115 of the registrar, it should be noted that the certificate authority 116, AAA 117, DNS 118, and DHCP module 119 may be run on separate processors connected to the registrar 106 with the registrar 106 acting as a communications gateway that provides optical elements to access to the certificate authority 116, AAA 117, DNS 118, and DHCP module 119.

The processors 107 and 113 of the autonomic optical network element 102 and the registrar 106 of the optical network 10 may be a single processor or multiple processors working together or independently to perform a task. In some embodiments, the autonomic optical network element 102 and the registrar 106 may be partially or completely network-based or cloud based. Additionally, the registrar 106 may or may not necessarily be located in a single physical location.

Exemplary embodiments of the processor 107 of the autonomic optical network element 102 and the processor 113 of the registrar 106 may include, but are not limited to, a digital signal processor (DSP), a central processing unit (CPU), a field programmable gate array (FPGA), a microprocessor, a multi-core processor, combinations, thereof, and/or the like, for example. The processors 107, 113 may be capable of communicating with the memory 110 and memory 115 via a path (e.g., data bus).

The memory 110 of the autonomic optical network element 102 and the memory 115 of the registrar 106 may be capable of storing processor executable code. Additionally, the memory 110 of the autonomic optical network element 102 and the memory 115 of the registrar 106 may each be implemented as a conventional non-transitory memory, such as for example, random access memory (RAM), CD-ROM, a hard drive, a solid-state drive, a flash drive, a memory card, a DVD-ROM, a disk, an optical drive, combinations thereof, and/or the like, for example.

In some embodiments, the memory 110 of the autonomic optical network element 102 and the memory 115 of the registrar 106 may be located in the same physical location as the autonomic optical network element 102 and the registrar 106, and/or one or more of the memory 110 of the autonomic optical network element 102 and the memory 115 of the registrar 106 may be located remotely from the autonomic optical network element 102 and the registrar 106. For example, the memories 110, 115 may be located remotely from the autonomic optical network element 102 and/or the registrar 106 and communicate with the processors 107, 113 via the optical network 10 or electronically. Additionally, when more than one memory 110 and/or memory 115 is used, a first memory 110 of the autonomic optical network element 102 and a first memory 115 of the registrar 106 may be located in the same physical location as the processors 107, 113, and additional memory may be located in a location physically remote from the processors 107 and 113. Additionally, one or more of the memory 110 of the autonomic optical network element 102 and the memory 115 of the registrar 106 may be implemented as a "cloud" non-transitory computer readable storage memory (i.e., one or more memory 110 and memory 115 may be partially or completely based on or accessed using the optical network 10).

As used herein, the terms "network-based," "cloud-based," and any variations thereof, are intended to include the provision of configurable computational resources on demand via interfacing with a computer and/or computer network, with software and/or data at least partially located on a computer and/or computer network.

The autonomic optical network element 102 and the registrar 106 may be capable of interfacing and/or communicating via the optical network 10. For example, the autonomic optical network element 102 and the registrar 106 may be configured to interface by sending signals (e.g., analog, digital, optical, and/or the like) via one or more ports (e.g., physical ports or virtual ports) such as the communication device 108 of the autonomic optical network element 102 and the communication device 114 of the registrar 106 using a network protocol, for example. Additionally, each autonomic optical network element 102 may be configured to interface and/or communicate with other autonomic optical network elements 102 directly and/or via the optical network 10, such as by exchanging signals (e.g., analog, digital, optical, and/or the like) via one or more ports, such as the communication device 108, for instance.

In some embodiments, the autonomic control planes 111, 111a, and 111b, the certificate authority 116, the AAA 117, the DNS 118, and the DHCP module 119 may be processor executable code which may be stored in the memory 110 of the autonomic optical network element 102 and/or the memory 115 of the registrar 106. In some embodiments, the processor executable code may be implemented in a stand-alone environment operating on a single computer system and/or processor executable code may be implemented in a networked environment such as a distributed system using multiple computers and/or processors, for example. It should be noted that as used herein, processor executable code is another term for software instructions and/or firmware which may be executed on any appropriate hardware.

Every device, such as the autonomic optical network elements 102a-102f, the optical amplifiers 104a and 104b, the registrar 106, and the one or more cards 109, within the autonomic domain 100 may be provided with an immutable secure unique device identifier (SUDI), which may be stored in the corresponding secure device identifier modules 112, 112a, and 112b. The uniqueness is ensured by construction such that no two devices manufactured by an equipment vendor have the same SUDI. In accordance with the present disclosure, the definition of a device is broad. For example, a device may be a holder, like a chassis, or a contained/logical equipment, like an optical line card within the chassis.

One exemplary SUDI convention which may be utilized is detailed in IEEE 802.1AR (2009), the entirety of which is hereby expressly incorporated herein by reference. Every device's cryptographic credential may be underpinned by the SUDI, which acts as a hardware trust anchor.

Each of the autonomic optical network elements 102a-102f, the optical amplifiers 104a and 104b, the registrar 106, and the one or more cards 109, may comprise a corresponding SUDI hardware module, such as secure device identifier modules 112, 112a, and 112b. The SUDI hardware modules 112 may contain hardware and/or software including one or more of the following:

(a) True random number generator(s) (RNG), preferably hardware based non-deterministic RNGs. The random number generator(s) may ensure cryptographic soundness in deriving nonces, salts, and public-private key pairs.

(b) A corresponding one initial secure device identifier (IDevID) and zero or more locally significant secure device identifiers (LDevID). The IDevID is generated during the equipment manufacturing and cannot be changed for the entire lifetime of the SUDI module. For purposes of electronic distribution and PKI, secure device identifier certificates, such as X.509 certificates, are generated which use the IDevID/LDevIDs as identifiers. The associated private keys of these certificates are stored within the SUDI modules 112 in a tamper proof manner. This is achieved through one-time programmable memory as suggested in IEEE, 802.1AR: Secure Device Identity, Std., 2009, the entirety of which is hereby expressly incorporated herein by reference.

(c) One or more symmetric and asymmetric cryptographic algorithms (including elliptic curve cryptography) for digital signatures and integrity validation. An embedded OS within the SUDI modules 112 may ensure that cryptographic secrets like private keys never leave the module boundary.

Other specifications and programmable APIs for operation of the SUDI hardware modules 112 are detailed in IEEE, 802.1AR. Equipment vendors integrate SUDI hardware modules 112 on to all optical devices and circuit packs, for instance they produce. During device manufacturing, a secure device identifier certificate, such as a X.509 Certificate which complies with the X.509 standard, is generated, that is bound to the unique IDevID, and is signed by the equipment vendor. The secure device identifier certificate may be generated externally from the autonomic optical network elements 102a-102f using a certificate generation appliance, for instance, then transferred to the SUDI hardware modules 112 of the autonomic optical network elements 102a-102f as part of the manufacturing process. The secure device identifier certificate may be encoded in many different formats such as DER, PEM, PKCS #7, etc. This allows customers purchasing the autonomic optical network elements 102a-102f to cryptographically identify and authenticate the equipment manufacturer.

Operators procure equipment from the equipment vendor through the process of placing purchase orders, for instance. Once purchased, a bill of sale may be provided which includes the SUDI of all the equipment purchased. This list is consolidated into a whitelist, which may be stored at a centralized registrar, such as the registrar 106. The registrar 106 may refer to this whitelist to allow or deny new devices requesting to join the autonomic domain 100, for example, based on the secure device identifier certificate stored in the SUDI hardware modules 112.

In addition to the whitelist, the operator may obtain the equipment manufacturer's digital secure device identifier certificate, such as a X.509 Certificate, and may install this within their PKI infrastructure (as described previously). This is necessary since the IDevID of the device is signed by the equipment manufacturer. Obtaining the vendor's secure device identifier certificate is done through well-known PKI mechanisms. This process allows cryptographically authenticating the optical devices such as the optical network elements 102*a*-102*l*, the optical amplifiers 104*a* and 104*b*, and the registrar 106 in the autonomic domain 100 (already enrolled or otherwise) against a trusted equipment vendor list.

After this procurement phase, the operator may ship the optical devices to the geographical locations where they need to be deployed. At this point, the optical transport gear is ready for initial commissioning.

In addition to the whitelist, operators can administer additional security policies at the registrar 106 to allow or deny new optical devices from being enrolled into the autonomic domain 100. For example, an operator could administer a policy to only allow new optical devices that have a specific factory default software version to join the autonomic domain 100. In another example, in case of multi-vendor optical network, a registrar policy could be in place to deny enrolling optical devices of a specific vendor (or a specific product family) due to the presence of a critical security vulnerability.

At the heart of the autonomic operation is the presence of the registrar 106 which is logically centralized. There exists at least one registrar for every autonomic administrative domain, such as the registrar 106 for the autonomic domain 100. The equipment whitelist and the security policies may be stored in the registrar 106. The registrar 106 is responsible for the admission (rejection) of a new device/node into the autonomic domain 100. This is done based on successful (unsuccessful) verification of the new device's cryptographic credentials (and the whitelist). The registrar 106 acts as a zero-touch bootstrap server that provides the initial configuration for the new device. Startup parameters such as control and management plane configuration and initial software image can also be part of the registrar 106. In one implementation, the registrar 106 may be a logical collection of processes (and services) running on an enterprise-grade server. The registrar 106 becomes a gateway for the devices such as the optical network elements 102*a*-102*f* and the optical amplifiers 104*a* and 104*b* in the autonomic domain 100 and for services such as DHCP, PKI and AAA.

The registrar 106 does not carry out optical data plane traffic forwarding. The registrar 106 is only concerned with admission control (allow/block/revoke) of devices into the autonomic domain 100. Failure of a solitary registrar 106 would result in newer devices not being able to join the autonomic domain 100. There can be additional registrars for purposes of redundancy with registrar state replicated between the active and standby instances. Registrar discovery will be discussed further herein.

Figure 4:
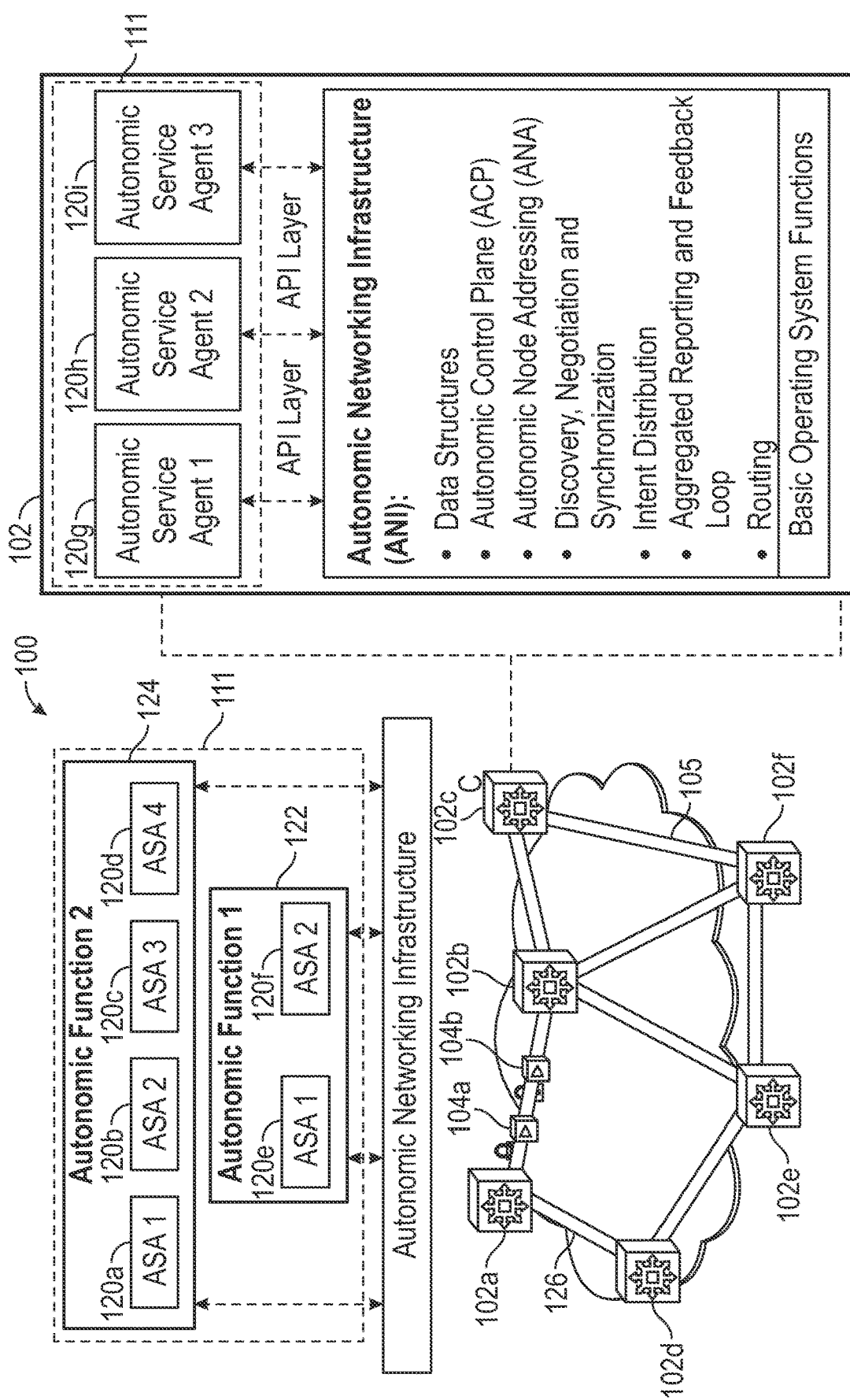
FIG. 4 is a diagram of exemplary autonomic control plane configurations of network elements of the autonomic domain of FIG. 3A in accordance with one aspect of the present disclosure.

Referring now to FIG. 4, shown therein are certain elements of the autonomic domain 100 of FIG. 3A. In the autonomic domain 100, every optical network element 102*a*-102*f*, the registrar 106, and one or more of the cards 109, implements an instance of the autonomic control plane (ACP) 111. The ACP 111 is a lightweight collection of services and applications that sits above a base operating system. The ACP 111 is bundled as part of every factory default software image that is shipped by the equipment vendor. The role of ACP 111 is to provide every optical network element 102*a*-102*f* the necessary tools (neighbor discovery, messaging, routing) to communicate with other optical network elements in the autonomic domain 100 and self-form a control overlay topology. The ACP 111 is an independent entity from the optical GMPLS control plane whose primary responsibility is optical data plane service provisioning.

An architecture for an exemplary ACP 111 is illustrated and described in IETF, draft-ietf-anima-autonomic-control-plane-18: An Autonomic Control Plane, Std., 2018, the entirety of which is hereby expressly incorporated by reference herein. The broad functions (and requirements) of the ACP 111 include the following:

(a) Provide an always available and always ON connectivity between the optical network elements 102*a*-102*f* and the registrar 106 within the autonomic domain 100.

(b) The ACP 111 does not require any user configuration and operates in case of the underlying data plane misconfiguration. The ACP 111 reachability between the optical network elements 102*a*-102*f* is independent of the data plane topology.

(c) The ACP 111 has a separate address space from that of the data plane. The address space is self-managed (i.e., doesn't require manual configuration).

(d) The ACP 111 allows tunneling of management and application data between the optical network elements 102*a*-102*f* and the registrar 106.

(e) The ACP 111 also supports proxies (explained later) where intermediate NEs 102*a*-102*f* (who are already authenticated) forward messages between a new device seeking enrollment and the registrar 106.

(f) The ACP 111 provides security functions to ensure that messages are authenticated and/or encrypted.

FIG. 4 depicts the base capabilities of the ACP 111 supported by the autonomic optical network elements 102*a*-102*f*, the one or more cards 109, and the registrar 106 in the autonomic domain 100. The autonomic optical network elements 102*a*-102*f* and the registrar 106 have one or more autonomic service agents (ASA) 120*a*-120*i* which perform a defined autonomic task. A specific collection of such ASAs 120 result in realization of an autonomic function such as a first autonomic function 122 and a second autonomic function 124.

The ACP 111 of the autonomic optical network elements 102 and the ACP 111*b* of the registrar 106 uses the OSC for autonomic messaging given that by design, the OSC interfaces do not require any user configuration or administration. Subject to an OSC pilot laser powering up, an optical channel 126 between a first autonomic optical network element 102*a* and an adjacent fourth autonomic optical network element 102*d*, for instance, would automatically close a link with the adjacent fourth autonomic optical network element 102*d* on the other end of the fiber. Once an OC-3/STM-1 OSC path is enabled, an IPv6 over 100 Mbps Fast Ethernet stack is instantiated on top of the OSC control channel. The system automatically assigns a link-local IP address to this IPv6 interface which is derived from the link-layer Ethernet MAC address (standard IPv6 functionality). Given that OSC is independent from the data plane, running an IPv6 stack makes this an overlay on top of this control channel (virtual out-of-band channel). This fulfils the requirement for the ACP 111 exchanges to occur over an always-available, self-managed communication channel with self-managed addressing.

The ACP 111 of the autonomic optical network elements 102 and the ACP 111a of the one or more cards 109 may use a backplane, for instance, for autonomic messaging given that by design, the backplane does not require any user configuration or administration.

To ensure security, inter-network element autonomous communication happens over an encrypted and authenticated channel (e.g., IPsec or dTLS). These encryption mechanisms run on top of the established link-local IPv6 channel. Appropriate key exchange mechanisms such as Internet Key Exchange (IKE v1 or IKEv2, for example) with secure device identifier certificates (X.509 certificates, for example) ensure authentication and cipher suite negotiation. For the initial link-local communication, the autonomic optical network elements 102 may utilize the factory-programmed IDevID backed X.509 Certificates for authentication and deriving IPsec/TLS symmetric keys. After a successful enrollment with the registrar 106, the autonomic optical network elements 102 may be installed with new LDevID backed X.509 Certificates, which may be referred to herein as a local certificate, which are signed by the autonomic domain's certificate authority (CA), which may be referred to herein as a signed local certificate.

Given the nature of link-local communication, any control message sent by an autonomic network element such as the first autonomic optical network element 102a, for instance, is only destined for its adjacent neighbor, such as the fourth and second autonomic optical network elements 102d or 102b, and cannot be forwarded. Autonomic optical network elements 102 require discovering link-local adjacencies and to eventually establish a path to the registrar 106. This requires a protocol for discovery and routing of messages between the autonomic optical network elements 102.

To meet the ACP requirements, a lightweight routing protocol designed for a small memory and CPU footprint such as RPL may be used. RPL is primarily used in low-power and lossy networks such as wireless sensors and IoT, for example. RPL is optimized for one-to-many and many-to-one communication which in case of ACP 111, translates to registrar-to-all-nodes and nodes-to-the-registrar respectively. RPL also allows discovery of autonomic optical network elements 102 and choice of primitives used to decide route selection and the adjacency peering policy.

At the heart of RPL is the establishment of destination-oriented directed acyclic graphs (DODAG). A DODAG is a directed acyclic graph rooted at a single destination. Every node in the DODAG has a rank which indicates its relative position in the topology with respect to the root. Every node in the DODAG only keeps track of their parent nodes (without any state of their children). RPL defines different control messages carried within ICMPv6 control packets, allowing discovery of adjacencies, selection of parent(s) and dissemination of advertisements. Routing metric within the DODAG can be based on one or more objective functions, based upon link costs, low latency or other parameters.

Figure 5:
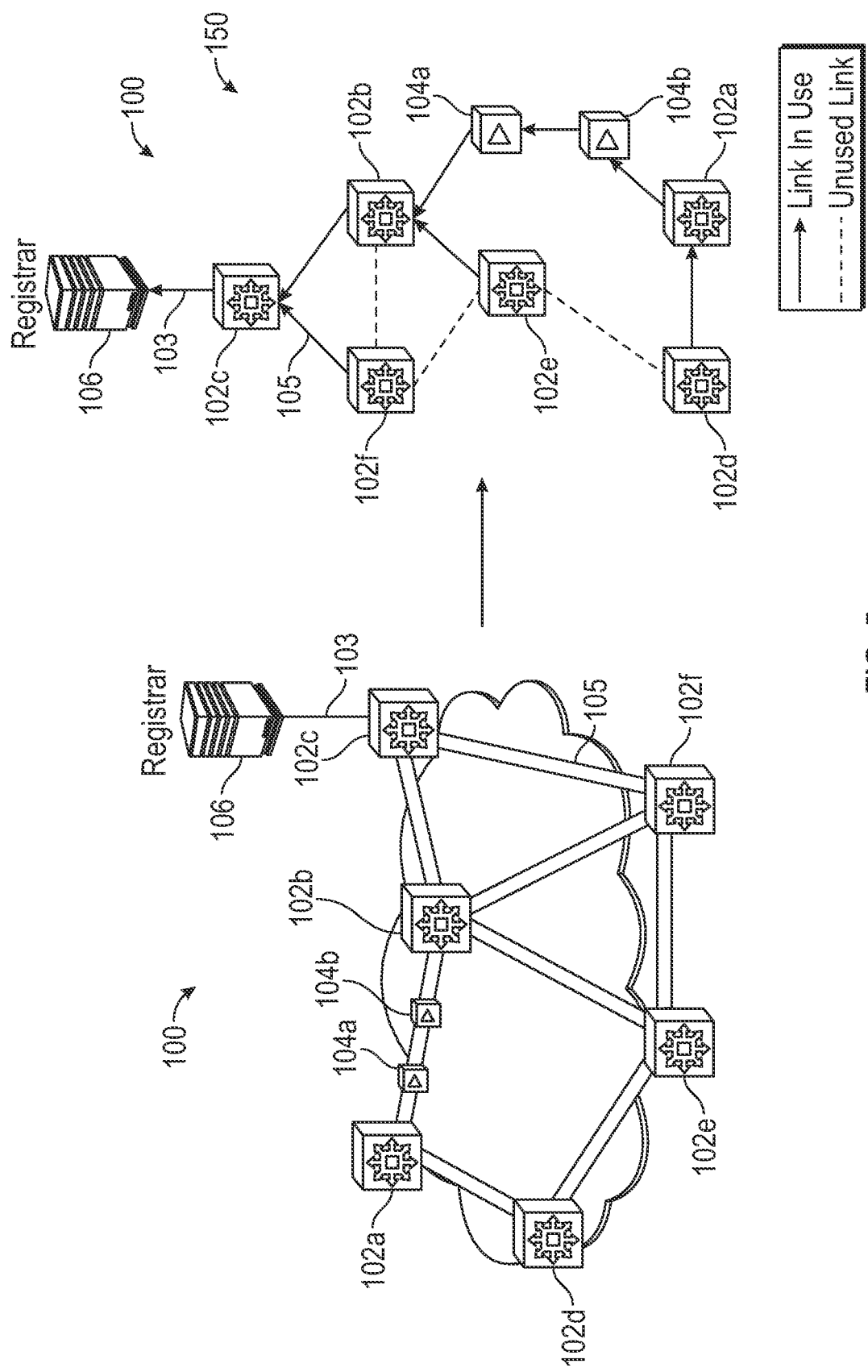
FIG. 5 is a diagram of an exemplary physical connectivity graph and a destination-oriented directed acyclic graph of the autonomic domain of FIG. 3A in accordance with one aspect of the present disclosure.

Referring now to FIG. 5, shown therein is a physical connectivity graph of the autonomic domain 100 and an example instance of a DODAG 150 overlay resulting from RPL. In the autonomic domain 100, after discovering link-local IPv6 adjacencies over the OSC, the ACP 111 of the autonomic optical network elements 102a-102f start exchanging RPL control messages resulting in a construction of the DODAG 150 for the autonomic domain 100. The registrar 106 also runs an ACP 111b instance and is the root of the DODAG 150. The registrar 106 information is disseminated downwards in an autonomic graph, allowing downstream autonomic optical network elements 102a-102f to select their parents. For instance, in DODAG 150, while the fourth autonomic optical network element 102d is connected to the first autonomic optical network element 102a and a fifth autonomic optical network element 102e, the fourth autonomic optical network element 102d has selected the first autonomic optical network element 102a as its parent.

RPL also allows the autonomic optical network elements 102a-102f to be aware of backup paths to their parent (unused links). The periodicity of RPL messages indicate the aliveness of a link. Reachability of any of the autonomic optical network elements 102a-102f to the registrar 106 is built as an overlay tunnel on top of the IPv6 links. To select which link to use, the autonomic optical network elements 102a-102f may be programmed to use an objective function based on link quality level. Specifically, metrics such as Q-values, bit error rates (BER), and/or signal-to-noise ratio (OSNR) of the optical channels may be used.

As illustrated in FIG. 5, the DODAG 150 is rooted at the registrar 106. One or more of the autonomic optical network elements 102, such as the third autonomic optical network element 102c, is link-locally IPv6 connected to the registrar 106 and discovers the registrar 106. The third autonomic optical network element 102c may then multicast this information regarding the registrar 106 to its link-local neighbors (in this example, the sixth autonomic optical network element 102f and the autonomic optical second network element 102b). This process continues further downstream in the autonomic domain 100. The autonomic optical network elements 102, on receipt of multiple RPL advertisements from neighboring autonomic optical network elements 102, may select parent autonomic optical network elements 102 based upon the link quality objective function. Eventually, an instance of the DODAG 150 is created, which may be used for all ACP communication between the autonomic optical network elements 102 and the registrar 106.

After RPL discovery, the autonomic optical network elements 102, such as the third autonomic optical network element 102c, that are directly (link-local) IPv6 connected to the registrar 106, enroll themselves with the registrar 106. When a new autonomic optical network device is provisioned and powered on, it goes through a similar discovery of its link-local neighboring autonomic optical network elements 102. For enrollment of the new autonomic optical network device to proceed, at least one of the discovered link-local neighboring autonomic optical network elements 102 must already be a part of the secure autonomic domain 100 and act as intermediate autonomic optical network elements 102. Such intermediate autonomic optical network elements 102 act as proxies performing verification of security credentials of the new device and relaying messages to the registrar 106. This process of enrolling new autonomic optical network devices gives the effect of growing the autonomic domain 100 boundary.

Given that the inter-node link encryption is link-local in scope, the autonomic optical network elements 102 acting as proxies stitch independent encrypted tunnels between the new device and the registrar 106 (e.g., {device↔proxy} and {proxy↔registrar}). More than one autonomic optical network element 102 acting as a proxy node can be present between a new unenrolled device and the registrar 106. The security aspects of verifying authenticity are based on the SUDI credentials of the new node and the autonomic optical network element 102 acting as a proxy node. The proxy node and the new node attempting to join the autonomic domain 100 may mutually authenticate each other based on IDevID certificates, which are signed by the device manufacturer. Once authenticated, an encrypted session may be established, after which the proxy may forward credentials of the new node to the registrar 106. Subject to the whitelist check of the registrar 106, the new node may be securely enrolled into the autonomic domain 100.

Figure 6:
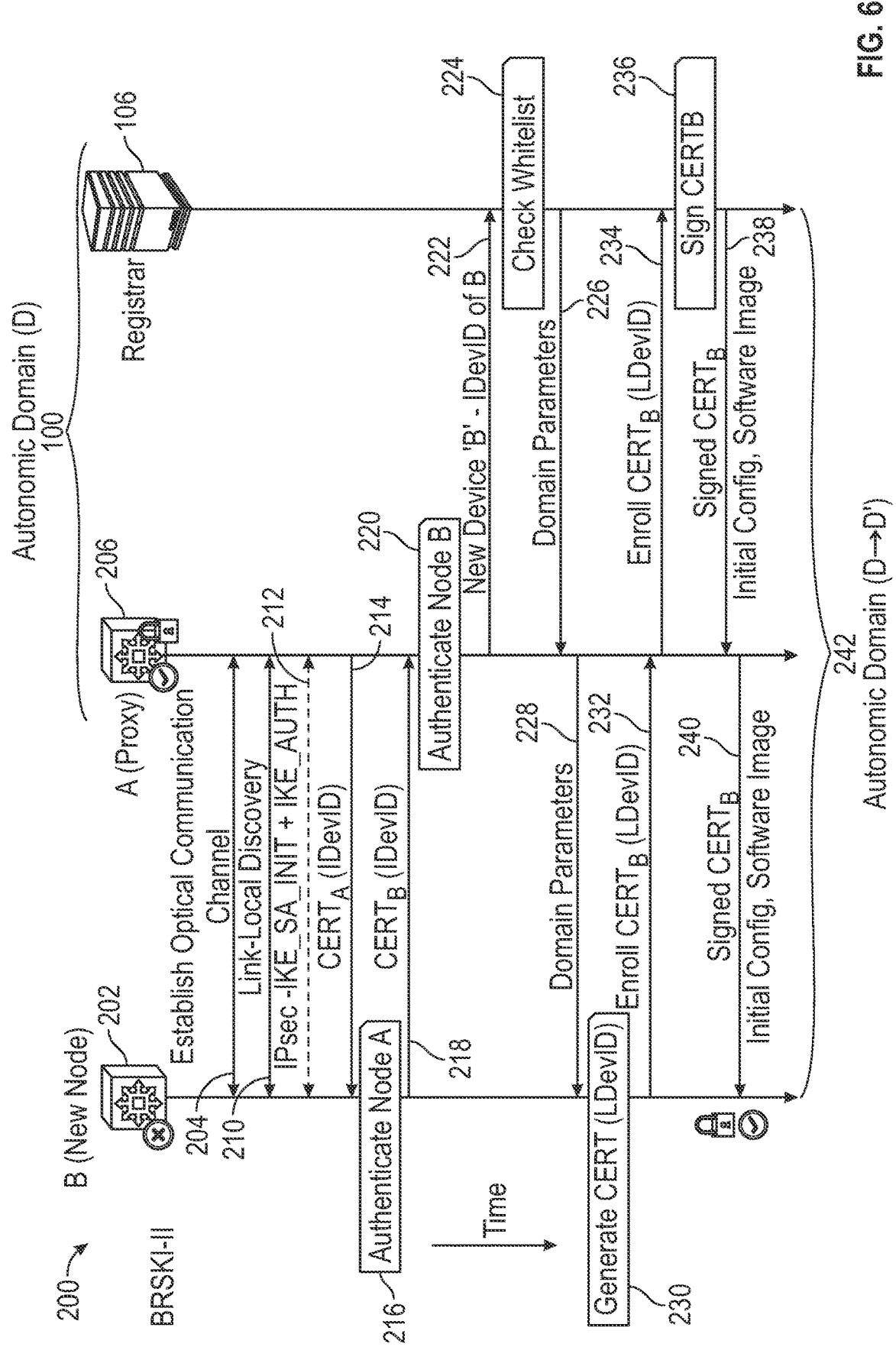
FIG. 6 is an exemplary process diagram of a new network element being bootstrapped into an existing autonomic domain or an optical network in accordance with the present disclosure.

FIG. 6 shows an exemplary workflow 200 for enrolling a new autonomic optical network element 202 in the autonomic domain 100. The enrollment of the new autonomic optical network element 202 is facilitated by an autonomic optical network element 102 acting as a proxy, such as the third autonomic optical network element 102c, running an instance of ACP 111. For this example, the third autonomic optical network element 102c acting as the proxy will be referred to as the proxy autonomic optical network element 206. Note that a similar process of enrollment previously applied to the proxy autonomic optical network element 206, and in this example, has already occurred.

In exemplary workflow 200, IPsec is used as an encryption tunnel mechanism. After the new autonomic optical network element 202 is powered-up, in step 204 an optical communication channel such as an OSC interface on a physical link towards proxy autonomic optical network element 206 is automatically brought up. In step 210, the new autonomic optical network element 202 instantiates an IP stack on the OSC interface and assigns a link-local address automatically. In step 210, an ACP 111 instance on the new autonomic optical network element 202 is operationally enabled and discovers the adjacency with the proxy autonomic optical network element 206 via RPL. In step 212, the new autonomic optical network element 202 and the proxy autonomic optical network element 206 go through an authentication phase, which may use IKEv2, for instance, to establish an encrypted IPsec tunnel by negotiating the encryption cipher suites via IKEv2. In step 214, the proxy autonomic optical network element 206 sends a SUDI (IDevID) backed secure device identifier certificate (such as a X.509 certificate) to the new autonomic optical network element 202. In step 216 the new autonomic optical network element 202 authenticates the proxy autonomic optical network element using the SUDI (IDevID) backed X.509 certificate. In step 218, the new autonomic optical network element 202 sends a SUDI (IDevID) backed secure device identifier certificate (such as a X.509 certificate) to the proxy autonomic optical network element 206. In step 220, the proxy autonomic optical network element 206 uses the SUDI (IDevID) backed X.509 certificate from the new autonomic optical network element 202 to establish/verify the authenticity of the new autonomic optical network element 202 (i.e., verify that the both the new autonomic optical network element 202 and the proxy autonomic network element 206 were manufactured by the same equipment vendor). In step 222, the proxy autonomic optical network element 206 forwards an enrollment request containing the SUDI (IDevID) backed X.509 certificate of the new autonomic optical network element 202 to the registrar 106

The registrar 106 compares the SUDI (IDevID) backed X.509 certificate of the new autonomic optical network element 202 to the information on the whitelist to ensure that new autonomic optical network element 202 is legitimate by verifying the SUDI (IDevID) backed X.509 certificate of the new autonomic optical network element 202. Subsequently, in step 226 the registrar 106 provides domain specific parameters for the new autonomic optical network element 202 to the proxy autonomic optical network element 206. In step 228, the proxy autonomic optical network element 206 forwards the domain specific parameters to the new autonomic optical network element 202. In step 230, the new autonomic optical network element 202 uses the provided domain specific parameters to generate a new LDevID secure device identifier certificate (such as a X.509 certificate). In step 232, the new autonomic optical network element 202 sends a certificate signing request to the registrar 106 containing the new LDevID X.509 certificate. In step 236, the registrar 208 signs the LDevID X.509 certificate. In step 238, the registrar 208 sends the signed LDevID X.509 certificate back to the new autonomic optical network element 202. This allows the new autonomic optical network element 202 to be enrolled into the autonomic domain 204 (with PKI registration) which has now grown from the original autonomic domain 100 to a new autonomic domain 242.

The registrar 106 can optionally provide the newly enrolled autonomic optical network element 202 with an updated software image (with digital signatures) and supply an initial configuration to bring the new autonomic optical network element 202 to a well-known (or default) state. These include parameters such as GMPLS configurations, creation of additional user profiles, etc. With the help of this initial parameter set, the new autonomic optical network element 202 can complete configuring the rest of the system configuration (data, control & management planes) as per the operator's policies.

Like the security policies of the registrar 106 discussed above, every autonomic optical device can additionally be administered with security profiles. For example, an optical device (after enrollment) can be configured with a policy to provide proxy service to other new devices if and only if the incoming device has been manufactured by the same equipment vendor. Other security policies could include allowed cipher suites and cryptographic algorithms, user roles and privileges, etc.

The architecture discussed above uses RPL for ACP routing. Alternatives such as OSPF, IS-IS, or others are feasible and may provide better capabilities as compared to RPL. However, these protocols are heavy (for examples, in the amount of CPU, memory, and storage footprint) for purposes of autonomic bootstrapping.

As an objective for secure enrollment, the factory default software image shipped with the autonomic optical NE 102 may be a bare minimum and may contain only the base operating system services. Subject to a successful enrollment, the device can be upgraded to a software image that allows unlocking the full capabilities of the hardware. The optical GMPLS control plane may be available only after such a software upgrade.

Although RPL has limited reachability (due to DODAGs as opposed to a maximally connected graph in the case of OSPF), the ACP messages are compact and are not delay sensitive. The flow of ACP messages is restricted (one-to-many and many-to-one). This alleviates the necessity to use heavier routing protocols since the connectivity graph doesn't require mesh or other non-point-to-point complex topologies.

Figure 6A:
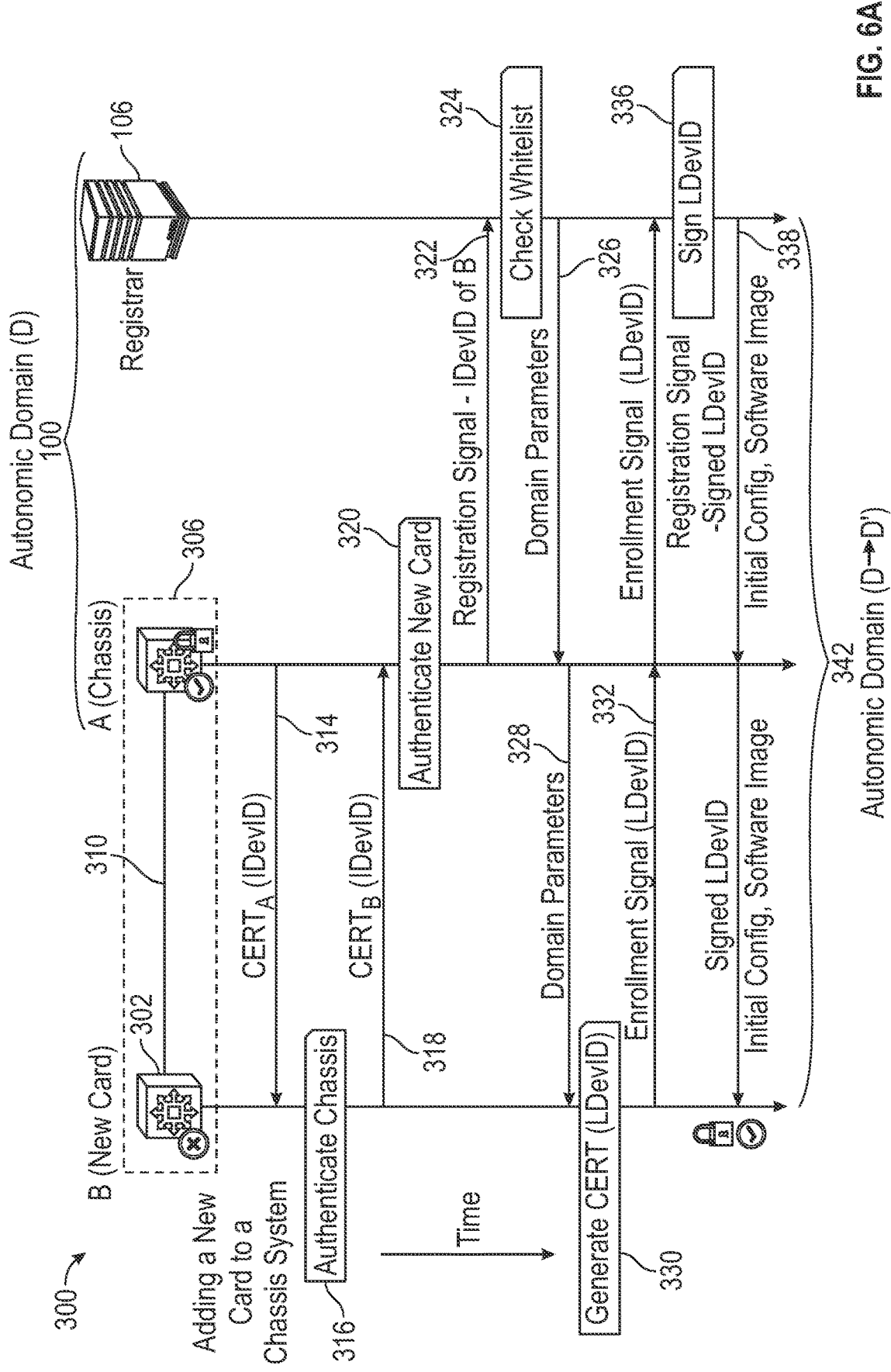
FIG. 6A is an exemplary process diagram of a new card being bootstrapped into an existing network element of an optical network in accordance with the present disclosure.

Referring now to FIG. 6A, shown therein is an exemplary workflow 300 for installing a new card 302 in a chassis which may be the third network element 102c in the autonomic domain 100, for instance. For this example, the third autonomic optical network element 102c will be referred to as the proxy autonomic optical network element 306. The workflow is similar to workflow 200 described above.

Therefore, in the interest of brevity, only the steps that are different will be described in detail herein.

When the new card 302 is installed in the proxy autonomic optical network element 306, a backplane 310 connects the new card 302 to the proxy autonomic optical network element 306. In such an embodiment, the establishment of a secure connection is not required as the backplane 310 is inherently secure because it is a hardware connection within the proxy autonomic optical network element 306

In step 314, the proxy autonomic optical network element 306 sends a SUDI (IDevID) backed secure device identifier certificate (such as a X.509 certificate) to the new card 302. In step 316 the new card 302 authenticates the proxy autonomic optical network element 306 using the SUDI (IDevID) backed X.509 certificate. In step 318, the new card 302 sends a SUDI (IDevID) backed secure device identifier certificate (such as a X.509 certificate) to the proxy autonomic optical network element 306. In step 320, the proxy autonomic optical network element 306 uses the SUDI (IDevID) backed X.509 certificate from the new card 302 to establish/verify the authenticity of the new card 302 (i.e., verify that both the new card 302 and the proxy autonomic network element 306 were manufactured by the same equipment vendor). In step 322, the proxy autonomic optical network element 306 forwards an enrollment request containing the SUDI (IDevID) backed X.509 certificate of the new card 302 to the registrar 106

In step 324, the registrar 106 may authenticate the new card, such as by comparing the SUDI (IDevID) backed X.509 certificate of the new card 302 to information in a whitelist to ensure that new card 302 is legitimate by verifying the SUDI (IDevID) backed X.509 certificate of the new card 302. Subsequently, in step 326 the registrar 106 may provide domain specific parameters for the new card 302 to the proxy autonomic optical network element 306. In step 328, the proxy autonomic optical network element 306 may forward the domain specific parameters to the new card 302. In step 330, the new card 302 may use the provided domain specific parameters to generate a new LDevID secure device identifier certificate (such as a X.509 certificate). In step 332, the new card 302 may send a certificate signing request to the registrar 106, for example, a request containing the new LDevID X.509 certificate. In step 336, the registrar 106 may sign the LDevID X.509 certificate. In step 338, the registrar 106 may send the signed LDevID X.509 certificate back to the new card 302. This allows the new card 302 to be enrolled into the autonomic domain 100 (with PKI registration), which has now grown from the original autonomic domain 100 to a new autonomic domain 342.

Exemplary embodiments of the new card 302 may include one or more of the following: (1) Traffic carrying ("data plane") cards that may have customized silicon such as ASICs or FPGAs that process the data plane frames/packets, based on the functionality of the card. For instance, a router line-card which has packet processing ASICs or other specialized silicon. For instance, an optical line card that includes a DSP module and/or optical photonic circuits; and (2.) Control cards ("control and management plane") that do not process the data packets but run all the software that implement the control plane (routing protocols) and management plane (management interfaces such as CLI, NETCONF, gRPC, DHCP etc.). They typically have an off-the-shelf CPU (such as Intel or ARM) and run some variant of an operating system (more recently, Linux or QNX or BSD).

Other common cards may also be added such as fan trays, power entry modules, and others that provide auxiliary functions of the chassis. These common cards do not require authentication to operate in the chassis as they do not have access to network data.

Figure 7:
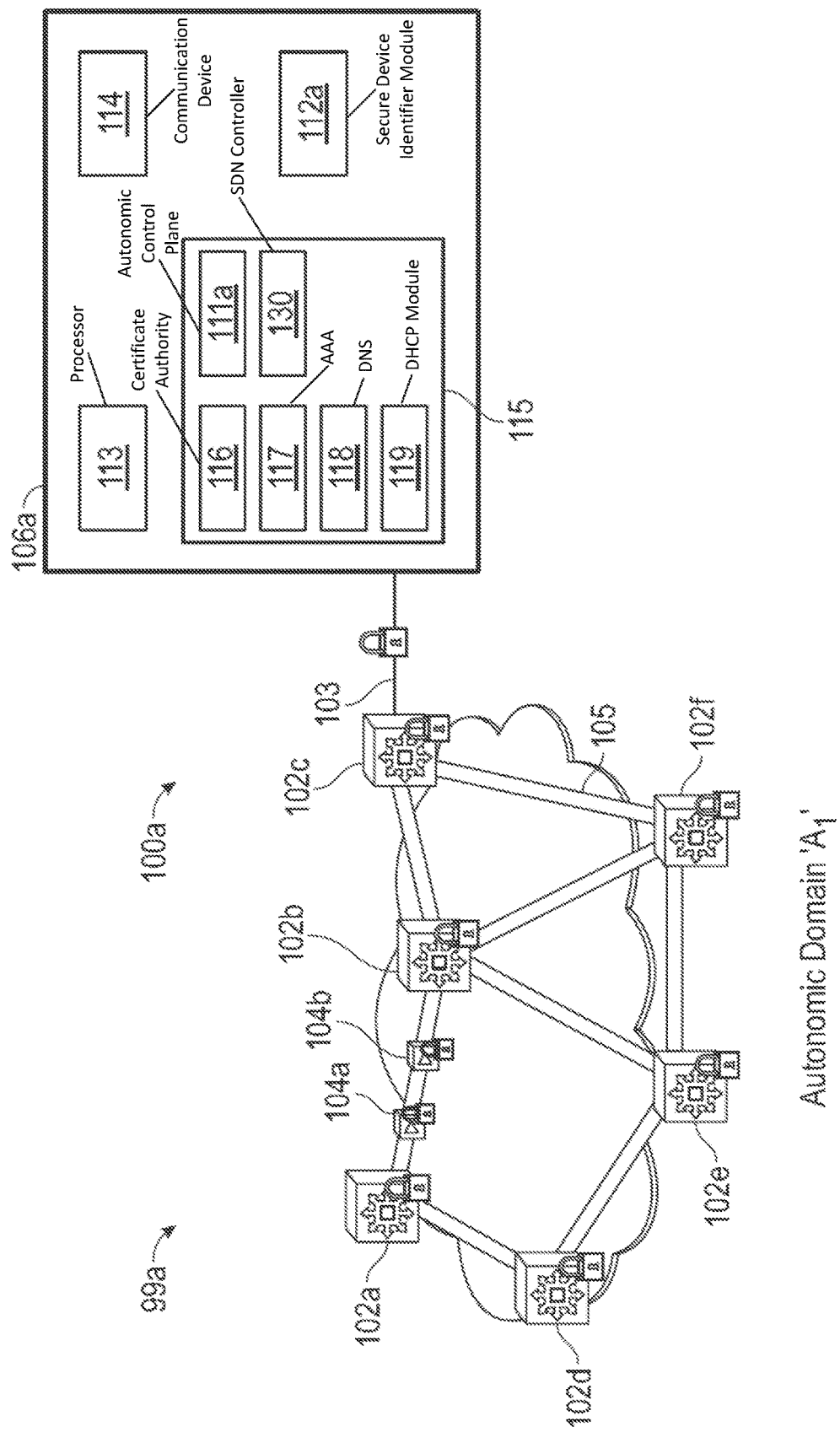
FIG. 7 is a diagram of another exemplary autonomic domain of an optical transport network in accordance with one aspect of the present disclosure.

Referring now to FIG. 7, shown therein is an autonomic optical network 99a having an autonomic domain 100a. The autonomic optical network 99a is similar to the autonomic optical network 99 discussed above. Therefore, in the interest of brevity, only the differences between autonomic optical network 99a and autonomic optical network 99 will be discussed in detail. The fundamental tenet of autonomic optical networks is the ability of the autonomic optical network 99a to self-form, self-organize, and self-manage. In some implementation, the functions of the registrar 106 may be embedded device applications or, if the functions are centralized, may be included in an SDN controller 130. If an SDN-managed network needs to be transformed to support autonomic capabilities, the SDN Controller 130 (and enrolling the SDN Controller 130) may be bootstrapped into the autonomic domain 100a. In such an autonomic optical network 99a, the registrar 106 continues to perform enrollment operations (over the supervisory channel enabled by the ACP) while the SDN Controller 130 programs the devices for data plane provisioning. Given that the registrar 106 is a central entity within the autonomic domain 100a, and has visibility to all the autonomic optical NEs 102, it is possible to collocate the SDN Controller 130 with the registrar 106 (as illustrated in FIG. 7), in which case, the SDN Controller 130 may be enrolled by default. The autonomic and SDN concepts are mutually complementary, meshing with each other seamlessly.

Optical power control loops and link provisioning are complex tasks involving a lot of manual and intricate procedures. A combination of autonomic bootstrapping, enrollment, and subsequently, an SDN-based optical power control approach can address this issue. Centralized optical span bring-up allows for global view of the optical end-to-end light path. In an exemplary embodiment of autonomic domain 100a of an autonomic optical network 99a, the SDN Controller 130 that has access to a management plane of every autonomic optical network element 102 in the autonomic domain 100a of the autonomic optical network 99a and can issue a command to the first autonomic optical network element 102a to start ramping up its Tx power while the SDN controller 130 monitors the Rx power at the second autonomic optical network element 102b in a tight loop. Recently, few prominent industry initiatives are attempting to foster interoperable optical layer data planes and programmable APIs. One of the primary objectives of these efforts is to devise generic optical link turn-up procedures, data models, and APIs that can function across different optical vendor equipment. There have been public demonstrations of SDN-based centralized management and control of optical layer which perform automated Layer 0 power controls and service management. A standard SDN Controller 130 (e.g., OpenDaylight, Frenetic, ONOS, NOX, PDX, etc.) can be complemented with autonomic domain functions to perform optical link provisioning and power controls (with a registrar implemented as an SDN Controller AAA plugin). This allows an autonomic optical network element's 102 autonomic enrollment (control and management plane) as well as the optical layer data plane be automatically configured to enable traffic flow. The optical span characteristics and parameters required for the power orchestration can be administered as SDN Controller 130 policies (for example, using Group Based Policy (GBP) in OpenDaylight, https://www.opendaylight.org/).

CONCLUSION

Secure autonomic network architecture for self-bootstrapping and self-forming optical transport networks with an increasing emphasis on programmability and automation, extending autonomic and zero-touch capabilities, are disclosed. Security mechanisms for building trusted autonomic domains, requirements for autonomic control plane and routing within the autonomic topology are disclosed. In addition to the autonomic discovery and enrollment, the disclosed autonomic network architecture can scale to include centralized SDN-based mechanisms for optical layer data plane link turn-up and traffic provisioning.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated by reference herein in their entirety:
ITU-T, G.709: Interfaces for Optical Transport Network, Std., 2012.
ITU-T, G.709: Interfaces for Optical Transport Network, Std., 2020.
ITU-T, G.694.1: Spectral Grids for WDM Applications, Std., 2012.
A. Sadasivarao el al., "Open Transport Switch: A Software Defined Networking Architecture for Transport Networks", in Proceedings of ACM SIGCOMM HotSDN, 2013.
V. Lopez et al., "Demonstration of SDN Orchestration in Optical Multivendor Scenarios" in Optical Fiber Communication Conference (OFC), 2015.
O. Gerstel, V. Lopez, D. Siracusa, "Multi-layer Orchestration for Application-centric Networking" in Proceedings of International Conference on Photonics in Switching (PS), 2015.
H. Rodrigues et al., "Traffic Optimization in Multi-layered WANs Using SDN," in Proceedings of the IEEE Symposium on High-Performance Interconnects (HOTI), 2014.
IETF, RFC 3495: Generalized Multi-Protocol Label Switching (GMPLS) Architecture, Std., 2009.
ONF, TR-527: Functional Requirements for Transport API, Std., 2016.
IRTF, RFC 7575: Autonomic Networking: Definitions and Design Goals, Std., 2015.
IEEE, 802.1AR: Secure Device Identity, Std., 2009.
IETF, RFC 5280: Internet X.509 Public Key Infrastructure Certificate and Certificate Revocation List (CRL) Profile, Std., 2008.
IETF, draft-ietf-anima-autonomic-control-plane-18: An Autonomic Control Plane, Std., 2018.
IETF, RFC 6550: RPL-IPv6 Routing Protocol for Low-Power and Lossy Networks, Std., 2012.
A. Mayzaud et al., "Using the RPL Protocol for Supporting Passive Monitoring in the Internet of Things", in Proceedings of the IEEE/IFIP Network Operations and Management Symposium (NOMS), 2016.
IETF, RFC 6551: Routing Metrics Used for Path Calculation in Low-Power and Lossy Network, Std., 2012.
OpenROADM Multi-source Agreement, http://www.openroadm.org.
ONF, Open and Disaggregated Transport Network (ODTN), https://www.opennetworking.org/odtni
O. Yilmaz, S. St-Laurent, M. Mitchell, "Automated Management and Control of a Multi-Vendor Disaggregated Network at the LO Layer", in Proceedings of the Optical Fiber Communication Conference (OFC), 2018.
OpenDaylight, https://www.opendaylight.org/.
3GPP, TS 32.500: Telecommunication management; Self-Organizing Networks (SON); Concepts and requirements, Std., 2015.
Y.-W.E. Sung et al., "Robotron: Top-down Network Management at Facebook Scale", in Proceedings of the ACM SIGCOMM, 2016.
B. Koley, "The Zero Touch Network", in Proceedings of IEEE International Conference on Network and Service Management (CNSM), 2016.
Arista, Zero Touch Provisioning, https://www.arista.com/en/solutions/zero-touch-provisioning.
Cisco, Zero Touch Provisioning, https://www.cisco.com/c/en/us/td/docs/routers/asr920/b_Chassis_Guide_asr920/using-ztp.html.
Cisco, Autonomic Networking: Where Do We Go From Here?, httpsliblogs.cisco.com/getyourbuildon/autonomic-networking-wheredo-we-g-from-here.
OpenDaylight, Secure Network Bootstrap Infrastructure (SNBI) https://wiki.opendaylight.oreview/SNBI_Architecture_and_Design.
IETF, draft-ietf-anima-bootstrapping-keyinfra-16: Bootstrapping Remote Secure Key Infrastructures (BRSKI), Std., 2018.
IETF, draft-ietf-anima-grasp-15: A Generic Autonomic Signaling Protocol (GRASP), Std., 2017.
ETSI, GS-AFI-002: Autonomic Network Engineering for the Selfmanaging Future Internet (AFI), Std., 2013.
Emilio Riccardi, "Disaggregation at the Optical Layer: Toward an Optical White Boxes Ecosystem?", in Proceedings of the Advanced Photonics, 2018.
V. Kamalov et al., "Lessons Learned from Open Line System Deployments", in Proceedings of the Optical Fiber Communication Conference (OFC), 2017.
L. Barletta et al., "QoT Estimation for Unestablished Lightpaths using Machine Learning", in Proceedings of the Optical Fiber Communication Conference (OFC), 2017.
M. Bouda et al., "Accurate Prediction of Quality of Transmission with Dynamically Configurable Optical Impairment Model", in Proceedings of the Optical Fiber Communication Conference (OFC), 2017.

What is claimed is:

1. A method of adding a network element in an optical network, comprising:
   connecting a new network element to an optical network having an autonomic domain comprising a proxy network element and a registrar, the new network element, the registrar, and the proxy network element each having an instance of an autonomic control plane and having a secure module, the secure module on the proxy network element storing a first identifier certificate and the secure module on the new network element storing a second identifier certificate;
   verifying, with the autonomic control plane on the new network element, the first identifier certificate from a first verification signal from the proxy network element;
   verifying, with the autonomic control plane on the proxy network element, the second identifier certificate from a second verification signal from the new network element;
   verifying, with the autonomic control plane on the registrar, the second identifier certificate from a third verification signal from the proxy network element;
   sending, with the autonomic control plane on the registrar, upon verification of the second identifier certificate, a parameters signal to the proxy network element, the parameters signal containing domain specific parameters;
   forwarding, with the autonomic control plane on the proxy network element, the parameters signal to the new network element;
   generating, with the autonomic control plane on the new network element, a local certificate derived from the secure module of the new network element and sending a certificate signal to the proxy network element, the certificate signal containing the local certificate;
   forwarding, with the autonomic control plane on the proxy network element, the certificate signal to the registrar;
   enrolling, with the autonomic control plane on the registrar, the new network element in the autonomic domain; and
   signing, with the autonomic control plane on the registrar, the local certificate, and sending a registration signal to the new network element, the registration signal containing the signed local certificate.

2. The method of claim 1, wherein verifying the first identifier certificate with the autonomic control plane on the new network element further comprises:
   establishing a supervisory channel between the new network element and the proxy network element over the optical network with the autonomic control plane of the new network element; and
   sending, with the autonomic control plane on the proxy network element, the first verification signal over the supervisory channel to the new network element, the first verification signal containing the first identifier certificate.

3. The method of claim 1, wherein the first identifier certificate stored on the secure module of the proxy network element and the second identifier certificate stored on the secure module of the new network element are assigned by a manufacturer of the proxy network element and the new network element.

4. The method of claim 1, wherein verifying, with the autonomic control plane on the registrar, the second identifier certificate comprises comparing the second identifier certificate of the new network element to a list of identifiers to find a matching identifier.

5. The method of claim 4, wherein the list of identifiers is received by the registrar and wherein the registrar verifies the list of identifiers by utilizing a public encryption key.

6. The method of claim 1, wherein verifying, with the autonomic control plane on the proxy network element, the second identifier certificate comprises utilizing a public encryption key to verify the second identifier certificate of the new network element.

7. The method of claim 1, wherein the registration signal further contains an initial configuration and a software image and, further comprising, deploying the initial configuration and installing the software image, upon receiving the registration signal, with the autonomic control plane on the new network element.

8. The method of claim 1, wherein establishing the connection between the new network element and the proxy network element with the autonomic control plane of the new network element further includes exchanging a series of connection signals between the autonomic control plane on the new network element and the autonomic control plane on the proxy network element over a supervisory channel to establish an encrypted channel of communication between the new network element and the proxy network element.

9. The method of claim 1, wherein establishing the connection between the new network element and the proxy network element with the autonomic control plane of the new network element is establishing a link-local connection on a supervisory channel.

10. A method for adding a network element to an optical domain, comprising:
   sending from, and receiving to, an autonomic control plane on a proxy network element in an optical domain, a series of connection signals with an autonomic control plane on a new network element, over a link-local connection, to establish an encrypted channel of communication between the new network element and the proxy network element;
   sending, with the autonomic control plane on the proxy network element, a first verification signal over the encrypted channel of communication to the new network element, the first verification signal containing a first identifier certificate, the first identifier certificate being generated using a secure unique device identifier of the proxy network element;
   receiving, with the autonomic control plane on the proxy network element, a second verification signal to the proxy network element over the encrypted channel of communication, the second verification signal containing a second identifier certificate, the second identifier certificate being generated using a secure unique device identifier of the new network element after the new network element has verified the first identifier certificate with the autonomic control plane on the new network element;
   verifying, with the autonomic control plane on the proxy network element, the second identifier certificate;
   sending, with the autonomic control plane on the proxy network element, upon verification of the second identifier certificate, a third verification signal to a registrar in the optical domain, over a supervisory channel, the third verification signal containing the second identifier certificate;
   receiving, with the autonomic control plane on the proxy network element from the registrar, a parameters signal over the supervisory channel, the parameters signal containing domain specific parameters, after verification of the second identifier certificate by the registrar;

forwarding, with the autonomic control plane on the proxy network element, the parameters signal over the encrypted channel of communication to the new network element;

receiving, with the autonomic control plane on the proxy network element from the new network element, a certificate signal containing a local certificate of the new network element, over the encrypted channel of communication;

forwarding, with the autonomic control plane on the proxy network element, the certificate signal to the registrar; and receiving, with the autonomic control plane on the proxy network element from the registrar, a registration signal over the supervisory channel, the registration signal containing a signed local certificate signed by the registrar.

11. The method of claim 10, wherein verifying, with the autonomic control plane on the proxy network element, the second identifier certificate comprises utilizing a public encryption key to verify the second identifier certificate of the new network element.

12. The method of claim 1, further including receiving an enrollment signal containing the second identifier certificate and a request to enroll the new network element with the registrar from the proxy network element after the proxy network element receives the second verification signal and verifies the second identifier certificate.

* * * * *